United States Patent
Hadfield et al.

(10) Patent No.: US 7,496,841 B2
(45) Date of Patent: Feb. 24, 2009

(54) METHOD AND SYSTEM FOR DOCUMENT COLLABORATION

(75) Inventors: Barrie Alan Hadfield, Blackheath (GB); Robin Wallace Glover, Didcot (GB); Stephen John Coates, London (GB); Steve Hopkins, Sittingbourne (GB)

(73) Assignee: Workshare Technology, Ltd., London (GB)

( * ) Notice: Subject to any disclaimer, the term of this patent is extended or adjusted under 35 U.S.C. 154(b) by 437 days.

(21) Appl. No.: 10/023,010

(22) Filed: Dec. 17, 2001

(65) Prior Publication Data

US 2004/0205653 A1    Oct. 14, 2004

(51) Int. Cl.
G06F 17/21 (2006.01)
G06F 3/00 (2006.01)
G06F 12/00 (2006.01)

(52) U.S. Cl. ............... 715/255; 715/229; 715/234; 715/751; 707/7; 707/201; 709/203

(58) Field of Classification Search ........... 715/530, 715/531, 200, 205, 210, 229, 234, 255, 256, 715/272, 273, 751, 760; 707/1, 3, 6, 7, 10, 707/100, 101, 200, 201, 203; 709/201, 202, 709/203, 205, 214, 215, 217
See application file for complete search history.

(56) References Cited

U.S. PATENT DOCUMENTS

| | | | |
|---|---|---|---|
| 4,479,195 A | 10/1984 | Herr et al. | 364/900 |
| 4,949,300 A | 8/1990 | Christenson et al. | 364/900 |
| 5,008,853 A | 4/1991 | Bly et al. | 364/900 |
| 5,072,412 A | 12/1991 | Henderson, Jr. et al. | 395/159 |
| 5,220,657 A | 6/1993 | Bly et al. | 395/425 |
| 5,245,553 A | 9/1993 | Tanenbaum | 364/514 |
| 5,247,615 A | 9/1993 | Mori et al. | 395/200 |
| 5,293,619 A | 3/1994 | Dean | 395/650 |
| 5,379,374 A | 1/1995 | Ishizaki et al. | 395/155 |
| 5,446,842 A | 8/1995 | Schaeffer et al. | 395/200.01 |

(Continued)

FOREIGN PATENT DOCUMENTS

WO    WO 00/60504    10/2000

OTHER PUBLICATIONS

PC Magazine "Pure Intranets: Real-TIme Internet Collaboration", Aug. 30, 2001.

(Continued)

*Primary Examiner*—Doug Hutton
*Assistant Examiner*—Maikhanh Nguyen
(74) *Attorney, Agent, or Firm*—Perkins Coie LLP

(57) ABSTRACT

The present invention provides techniques, including a system and method, for document collaboration between a managing author using a document management system (DMS), and one or more contributing authors. In one embodiment the managing author selects an original document from the DMS. Next, a replica of the original document is made and securely sent by the managing author to the one or more contributing authors. A contributing author may make proposed changes and comments to the replica. The edited replica with the proposed changes is converted into a response that is sent back to the managing author. The proposed changes for the contributing author are determined using the response and displayed on a graphical user interface (GUI) for viewing by the managing author. The managing author accepts or rejects the proposed changes to the original document from the contributing author.

6 Claims, 18 Drawing Sheets

U.S. PATENT DOCUMENTS

| | | | |
|---|---|---|---|
| 5,608,872 A | 3/1997 | Schwartz et al. | 395/200.04 |
| 5,617,539 A | 4/1997 | Ludwig et al. | 395/200.02 |
| 5,671,428 A | 9/1997 | Muranaga et al. | |
| RE35,861 E | 7/1998 | Queen | |
| 5,787,175 A | 7/1998 | Carter | |
| 5,819,300 A * | 10/1998 | Kohno et al. | 715/246 |
| 5,890,177 A | 3/1999 | Moody et al. | |
| 6,067,551 A | 5/2000 | Brown et al. | |
| 6,088,702 A | 7/2000 | Plantz et al. | 707/103 |
| 6,212,534 B1 | 4/2001 | Lo et al. | |
| 6,449,624 B1 * | 9/2002 | Hammack et al. | 707/203 |
| 6,513,050 B1 * | 1/2003 | Williams et al. | 707/202 |
| 6,560,620 B1 * | 5/2003 | Ching | 707/203 |
| 6,584,466 B1 * | 6/2003 | Serbinis et al. | 707/203 |
| 6,614,789 B1 * | 9/2003 | Yazdani et al. | 370/392 |
| 6,658,626 B1 * | 12/2003 | Aiken | 715/530 |
| 7,107,518 B2 * | 9/2006 | Ramaley et al. | 715/235 |

OTHER PUBLICATIONS www.objs.com, "Groupware & Collaboration Support", Aug. 30, 2001.

Tsai, et al., "A document Workspace for Collaboration and Annotation based on XML Technology", Department of Electrical Engineering, 2000, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

* cited by examiner

```
<?xml version="1.0" encoding="UTF-8"?>
<!-- Copyright (C) 2001 Workshare Technology-->
<!ELEMENT CollaborationDocumentID (#PCDATA)>
<!ATTLIST CollaborationDocumentID
        CustValueType CDATA #REQUIRED
>
<!ELEMENT CopyPaste (#PCDATA)>
<!ATTLIST CopyPaste
        CustValueType CDATA #REQUIRED
>
<!ELEMENT CustomData (Edit, Print, CopyPaste, FormatChange, Export, W97Compatibility, RtfSaved,
Disable_Export, Disable_Edit_Docs, Edf_Expiry_Date, OriginalDocumentID, CollaborationDocumentID,
RevisionName, SenderEmailAddr, SenderName, ReturnType, ReturnAddress)>
<!ELEMENT Disable_Edit_Docs (#PCDATA)>
<!ATTLIST Disable_Edit_Docs
        CustValueType CDATA #REQUIRED
>
<!ELEMENT Disable_Export (#PCDATA)>
<!ATTLIST Disable_Export
        CustValueType CDATA #REQUIRED
>
<!ELEMENT Edf_Expiry_Date (#PCDATA)>
<!ATTLIST Edf_Expiry_Date
        CustValueType CDATA #REQUIRED
>
<!ELEMENT Edit (#PCDATA)>
<!ATTLIST Edit
        CustValueType CDATA #REQUIRED
>
<!ELEMENT Export (#PCDATA)>
<!ATTLIST Export
        CustValueType CDATA #REQUIRED
>
<!ELEMENT FormatChange (#PCDATA)>
<!ATTLIST FormatChange
        CustValueType CDATA #REQUIRED
>
<!ELEMENT OriginalDocumentID (#PCDATA)>
<!ATTLIST OriginalDocumentID
        CustValueType CDATA #REQUIRED
>
<!ELEMENT Print (#PCDATA)>
<!ATTLIST Print
        CustValueType CDATA #REQUIRED
>
<!ELEMENT ReturnAddress (#PCDATA)>
<!ATTLIST ReturnAddress
        CustValueType CDATA #REQUIRED
>
<!ELEMENT ReturnType (#PCDATA)>
<!ATTLIST ReturnType
        CustValueType CDATA #REQUIRED
>
<!ELEMENT RevisionName (#PCDATA)>
<!ATTLIST RevisionName
        CustValueType CDATA #REQUIRED
>
<!ELEMENT RtfSaved (#PCDATA)>
<!ATTLIST RtfSaved
        CustValueType CDATA #REQUIRED
>
<!ELEMENT SenderEmailAddr (#PCDATA)>
<!ATTLIST SenderEmailAddr
        CustValueType CDATA #REQUIRED
>
<!ELEMENT SenderName (#PCDATA)>
<!ATTLIST SenderName
        CustValueType CDATA #REQUIRED
>
<!ELEMENT W97Compatibility (#PCDATA)>
<!ATTLIST W97Compatibility
        CustValueType CDATA #REQUIRED
>
```

FIG. 4

```
<?xml version="1.0" encoding="UTF-8"?>
<!-- Copyright (C) 2001 Workshare Technology-->
<!ELEMENT CollaborationDocumentID (#PCDATA)>
<!ATTLIST CollaborationDocumentID
        CustValueType CDATA #REQUIRED
>
<!ELEMENT CopyPaste (#PCDATA)>
<!ATTLIST CopyPaste
        CustValueType CDATA #REQUIRED
>
<!ELEMENT CustomData (Edit, Print, CopyPaste, FormatChange, Export, W97Compatibility, RtfSaved,
Disable_Export, Disable_Edit_Docs, OriginalDocumentID, CollaborationDocumentID, RevisionName, ReturnType,
ReturnAddress, UniqueID, SEnderName, SenderEmailAddr)>
<ELEMENT Disable_Edit_Docs (#PCDATA)>
<!ATTLIST Disable_Edit_Docs
        CustValueType CDATA #REQUIRED
>
<!ELEMENT Disable_Export (#PCDATA)>
<!ATTLIST Disable_Export
        CustValueType CDATA #REQUIRED
>
<!ELEMENT Edit (#PCDATA)>
<!ATTLIST Edit
        CustValueType CDATA #REQUIRED
>
<!ELEMENT Export (#PCDATA)>
<!ATTLIST Export
        CustValueType CDATA #REQUIRED
>
<!ELEMENT FormatChange (#PCDATA)>
<!ATTLIST FormatChange
        CustValueType CDATA #REQUIRED
>
<!ELEMENT OriginalDocumentID (#PCDATA)>
<!ATTLIST OriginalDocumentID
        CustValueType CDATA #REQUIRED
>
<!ELEMENT Print (#PCDATA)>
<!ATTLIST Print
        CustValueType CDATA #REQUIRED
>
<!ELEMENT ReturnAddress (#PCDATA)>
<!ATTLIST ReturnAddress
        CustValueType CDATA #REQUIRED
>
<!ELEMENT ReturnType (#PCDATA)>
<!ATTLIST ReturnType
        CustValueType CDATA #REQUIRED
>
<!ELEMENT RevisionName (#PCDATA)>
<!ATTLIST RevisionName
        CustValueType CDATA #REQUIRED
>
<!ELEMENT RtfSaved (#PCDATA)>
<!ATTLIST RtfSaved
        CustValueType CDATA #REQUIRED
>
<!ELEMENT SenderEmailAddr (#PCDATA)>
<!ATTLIST SenderEmailAddr
        CustValueType CDATA #REQUIRED
>
<!ELEMENT SenderName (#PCDATA)>
<!ATTLIST SenderName
        CustValueType CDATA #REQUIRED
>
<!ELEMENT UniqueID (#PCDATA)>
<!ATTLIST UniqueID
        CustValueType CDATA #REQUIRED
>
<!ELEMENT W97Compatibility (#PCDATA)>
<!ATTLIST W97Compatibility
        CustValueType CDATA #REQUIRED
```

FIG. 5

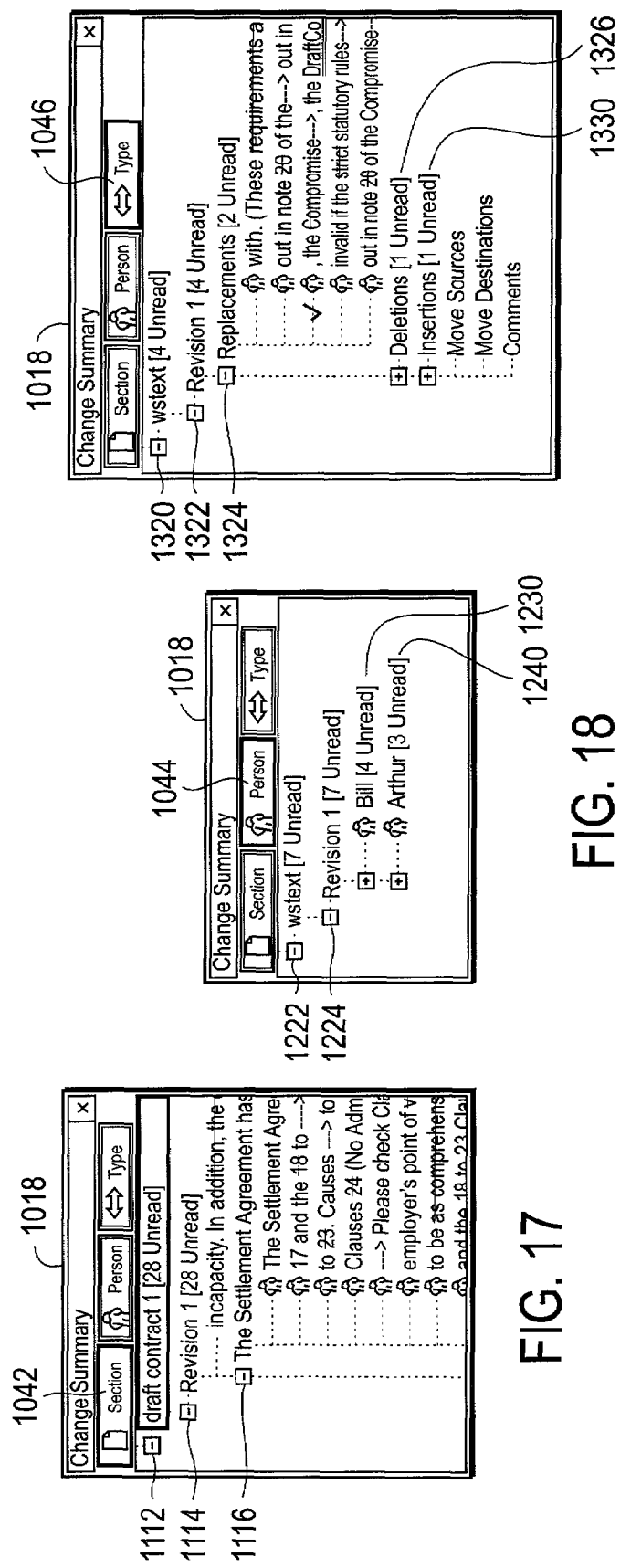

METHOD AND SYSTEM FOR DOCUMENT COLLABORATION

FIELD OF THE INVENTION

The invention relates generally to the field of document collaboration, and in particular to a method and system for document collaboration over a communications network.

BACKGROUND OF THE INVENTION

Document management systems have typically provided the infrastructure for document collaboration between professionals, particularly in corporations and the legal industry, and in other areas where a managing author, who maybe the originating author, of a document needs to keep control over the evolution of the document, e.g., from original document to final document. In recent years document management systems have been extending their functionality to encompass even more aspects of document collaboration, for example, including a workflow system to notify collaborators of the progress of work on any given document. Nevertheless, despite this progress, document management systems do not provide for incorporating the individual changes proposed by different collaborators into the managing author's document. This means that if person A wishes to have a document reviewed by persons B and C, once persons B and C have reviewed the file and suggested changes to it, person A is still left with the problem of incorporating those changes into the original document.

There have been several approaches to solving the above problem. One approach uses a synchronous writing system in which all authors can interactively change the original document. However, linking computers to enable truly synchronous writing, with any level of usefulness, is fraught with difficulties, such as document locking and access rights.

It is known in the prior art to have a system in which an original document is replicated and the replicas sent to the contributing authors. A contributing author edits the replica and sends the edited replica back to the originating author. A consolidated markup document is created in which, paragraph by paragraph, the original paragraph is displayed along with the corresponding edited replica paragraph from each contributing author. The originating author then selects which of the edits will be included in the final document. A consolidation procedure then removes the duplicate paragraphs from the consolidated document and produces a final document.

There are several problems with the prior art approach. First, the final document, without the duplication, cannot be viewed until after the originating author has made all his/her selections. Thus the originating author cannot see the final document as it evolves from the original, i.e., as changes are made. Second, as different versions of word processing software or even different word processing programs may be used by the collaborators, format corruption can occur. Third, the entire edited replica is sent back to the managing author rather than just the changes, hence increasing the response file size with unnecessary information.

In addition, the prior art uses the conventional methods, e.g., e-mail, to transfer documents to and from the collaborators, particularly collaborators communicating remotely, e.g., over the Internet. Unfortunately, these conventional methods have both security, control, and ease-of-use problems. For example, in order to seek revisions to a document, a managing author removes a document from the document management system, and sends it to the collaborators, either by e-mailing it or posting it on a web portal. Removing the document from the secured and controlled environment of document management system for editing, defeats the purpose of using such a system. This process exposes not only sensitive data, e.g., revision history, to the perils of e-mail and the Internet, but the originating author can easily lose track of files and their versions, because they are not in the DMS.

Therefore there is a need for document collaboration techniques, which provide, among other features, improved security and control of a document, when the document is modified by remote contributors over a communications network, especially a network with public access such as the Internet. In addition, there is a need for improved techniques for determining a response and incorporating the changes from the response into the original document.

SUMMARY OF THE INVENTION

The present invention provides techniques, including a system and method, for document collaboration between a managing author using a document management system (DMS), and one or more contributing authors. The present invention formalizes the relationship between the people involved in working on a document. There are two types of authors: managing authors and contributing authors. A managing author is responsible for the whole process of collaboration on an original document, from start to finish, and has sole control over which modifications offered by the contributing authors are accepted into the final document. Contributing authors only suggest or propose changes to a document. There is only one managing author per collaboration. There might be any number of contributing authors per collaboration on a document. In the context of this application, "original document" includes more than a document created by the managing author, but any document selected by the managing author to start the collaboration process. For example, the "original document" includes an evolving document having the original document modified by one or more changes, selected by the managing author.

In one exemplary embodiment of the present invention the managing author selects a original document from the DMS. Next, a replica of the original document is made and securely sent by the managing author to the one or more contributing authors. Each contributing author may freely edit the replica, thereby proposing changes and adding comments. Thus, there may be multiple copies of the replica distributed for the purposes of the collaboration. Each edited replica with the proposed changes is converted into a response that is sent back to the managing author. The proposed changes for each contributing author are determined using the response and displayed on a graphical user interface (GUI) for viewing by the managing author. The managing author accepts or rejects the proposed changes to the original document from each contributing author, and the accepted changes then modify the original document.

Another embodiment of the present invention provides a computer system, for a collaborating author to respond to a request to review a replica of an original document sent by a managing author. The computer system includes: a word processing module for editing the replica, hence forming an edited replica, and a difference module for creating a difference file using the replica and the edited replica. In addition, the system may further include an encryption module for encrypting data comprising an item identifying the collaborating author and a response module for generating a response file having the encrypted data, and the difference file. The data is preferably in XML format.

An embodiment of the present invention provides a method for document collaboration between a managing author operating a first computer system and a contributing author operating a second computer system. The method includes the managing author, selecting an original document stored in a memory accessible to the first computer system. Next, an electronic replica of the original document is created, and word processing editing rights are selected for the electronic replica. A message, including the word processing editing rights and the electronic replica, is sent to a memory location accessible by the second computer system.

An aspect of the present invention includes a data structure stored in a computer readable medium for providing a replica of an original document from a managing author to a contributing author. The data structure preferably includes: eXtensible Markup Language (XML) data including editing rights for the replica; and a word processing file. In addition another data structure stored in a computer readable medium for providing an edited replica from a contributing author to a managing author is also provided. The data structure includes: extensible markup language (XML) data including an identification of the contributing author; and a difference file formed from using the edited replica.

Another aspect of the present invention provides a data structure stored in a computer readable medium for version control of a document collaboration system by a managing author. The data structure includes: a collaboration object having an original document selected by the managing author; a document object derived from the collaboration object and including one or more revision objects associated with the original document; and none or more response objects derived from the revision object, where the response object is associated with a response from a collaborating author to the managing author.

Another embodiment of the present invention provides a system for sending a replica of an original document from a managing author to a contributing author for review. The system includes: a first software module on a first computer system, for creating the replica from the original document stored in a document management system; a user interface module for selecting editing privileges of the contributing author; a second software module on the first computer system, for creating an EDF file, wherein the EDF file comprises the replica and selected editing privileges of the contributing author; an encryption module for encrypting the EDF file; and an e-mail module for e-mailing the EDF file, after the encrypting, to the contributing author.

An embodiment of the present invention gives a method, using a computer system, for a collaborating author to respond to a request to review a replica of an original document sent by a managing author. The replica is edited based on editing privileges set by the managing author, and a difference file is created using the replica and the edited replica.

Another embodiment of the present invention provides a method, using a computer system, for generating a response to a replica of an original document sent by a managing author to a contributing author for review. A revised replica is formed by editing the unedited replica. Next, the unedited replica is partitioned into a first plurality of segments. The segments of the first plurality of segments are sorted into a binary tree based on a comparison operator. The revised replica is partitioned into a second plurality of segments. Next, for a segment of the second plurality of segments, a best match is found in the binary tree to form a block of at least one matching byte. And a difference file, including the block, is created.

Another aspect of the present invention provides a method in a computer system for processing a proposed change to a replica of an original document by a contributing author, where the replica is sent by a managing author. The method includes: the contributing author inputting the proposed change into the computer system; in response to the inputting, displaying the proposed change without mark-up on a display; and sending the proposed change to the managing author.

Yet another aspect of the present invention comprises a method, using a computer system, for processing a response from a contributing author, where the contributing author edits a replica of an original document sent by a managing author. The method comprises, receiving the response from the contributing author, where the response includes a difference file. Next, a comparison file from the difference file and the original document is generated. The comparison file, including a proposed change by the contributing author, is displayed. And the original document, with the proposed change accepted by the managing author, is then modified.

In a further embodiment of the present invention a method, using a computer system, for a managing author producing a final document from a plurality of responses received from a plurality of contributing authors is provided. The plurality of responses is based on a replica of an original document. First, a comparison window, including a proposed change from a response of the plurality of responses, is displayed. Then the original document is modified, when the proposed change is accepted by the managing author. And the modified original document is displayed in an evolving document window.

A further aspect of the present invention comprises a method, using a computer system, for producing an evolving document from an original document and an edited copy of the original document, where the edited copy is produced by a contributing author and sent in a response to a managing author. The method includes: obtaining a plurality of areas of a reconstructed edited copy, where the reconstructed edited copy is partly based on the response, and wherein a first area of the plurality of areas comprises a difference between a first part of the original document and a second part of the reconstructed edited copy; displaying the first area and a second area of the plurality of areas; when the difference is selected, incorporating the difference into the evolving document; and after the difference is selected, concurrently displaying the evolving document and the second area.

A further embodiment of the present invention comprises a method for version control in a computerized document collaboration system. A first replica of an original document is created by a managing author's computer system. Next, one or more responses, comprising edits to the first replica, are received. An edited replica is reconstructed using the first response. Then a modified original document is formed by incorporating selected changes, from the edited replica into the original document. A second response, including second changes to the modified original document, is received. And the managing author's computer system associates the second changes with the modified original document.

An alternate embodiment of the present invention comprises a system for document collaboration from a managing author controlling an original document at a first computer system to a contributing author editing a replica of the original document at a second computer system. The system includes: a document management system under control of the first computer system for maintaining the original document; a replica module for creating a replica of the original document and sending the replica with accompanying editing instructions to the second computer system; a contributor module at the second computer system for receiving and editing the replica according to the editing instructions, and for creating a difference file based on the replica before and after editing; a receive module for receiving a response from the second computer system, the response including the difference file; and a controller module for extracting proposed changes from the difference file and for deciding which of the proposed changes are accepted.

Another embodiment of the present invention comprises a method for assigning a plurality of roles in a document collaboration system. Each role has computer resources associated with it. The method comprises a contributing author role for proposing changes to a replica of an original document using a contributor application stored on a client computer. The contributor application includes an embedded word processing module. The method further includes a managing author role for selecting proposed changes received from at least one contributor application and for incorporating selected changes into said original document using a manager application stored on a server computer, where the manager application includes another embedded word processing module.

These and other embodiments, features, aspects and advantages of the invention will become better understood with regard to the following description, appended claims and accompanying drawings.

BRIEF DESCRIPTION OF THE DRAWINGS

FIG. 4 is a Document Type Definition (DTD) for the XML of the EDF file of an aspect of the present invention;

FIG. 5 is a Document Type Definition (DTD) for the XML of the RDF file of another aspect of the present invention;

FIG. 6-1 is an object structure of the XDF file of yet another aspect of the present invention;

FIG. 6-2 is an example of a graphical illustration of the structure of the XDF file of a further aspect of the present invention;

FIG. 17 shows an example of a change summary window with the section tab 1042 selected of an aspect of the present invention;

FIG. 18 shows an example of a change summary window with the person tab 1044 selected of another aspect of the present invention; and FIG. 19 shows change summary window 1018 with the type tab selected of yet another aspect of the present invention.

DETAILED DESCRIPTION OF THE INVENTION

In the following description, numerous specific details are set forth to provide a more thorough description of the specific embodiments of the invention. It will be apparent, however, to one skilled in the art, that the invention may be practiced without all the specific details given below. In other instances, well known features have not been described in detail so as not to obscure the invention.

Figure 1:
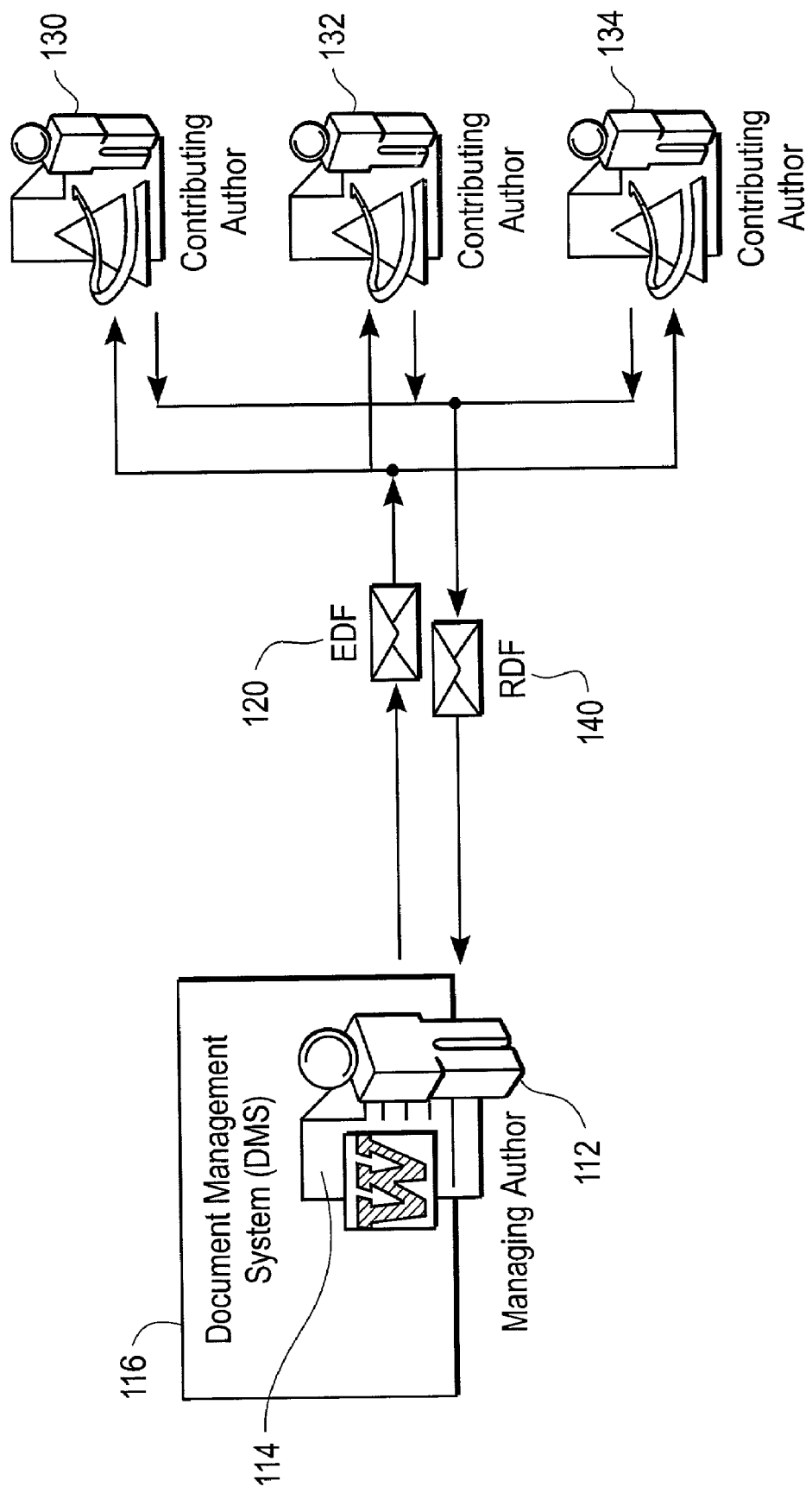
FIG. 1 is a simplified example of the collaboration process of an embodiment of the present invention.

FIG. 1 is a simplified example of the collaboration process of an embodiment of the present invention. The managing author 112 creates (or selects) the original document 114 e.g., a Microsoft® Word Document, which is maintained in the Document Management System (DMS) 116. Next, a metadata-free replica of the original document 114 is made, while the original document 114 remains under the control of the DMS 116. The replica is converted to an Enhanced Document Format (EDF) file 120 and is encrypted, compressed, and sent, e.g., e-mailed, by the managing author 112 to one or more contributing authors, e.g., 130, 132, and 134. Editing software operated by a contributing author uncompresses and decrypts the EDF file. The contributing authors, e.g., 130, 132, and 134, may each make edits and comments to the replica. Each contributing author's changes to the original document are re-encrypted and converted (with a single click) into a response document format (RDF) file 140, that is securely sent, e.g., e-mailed, back to the managing author 112. The proposed changes for each contributing author are determined using the RDF file 140 and compiled in a single place for viewing by the managing author 112. The managing author 112 accepts or rejects the changes to the original document 114 from each contributing author, and the accepted changes then modify the original document 114 in the DMS 116.

Figure 2:
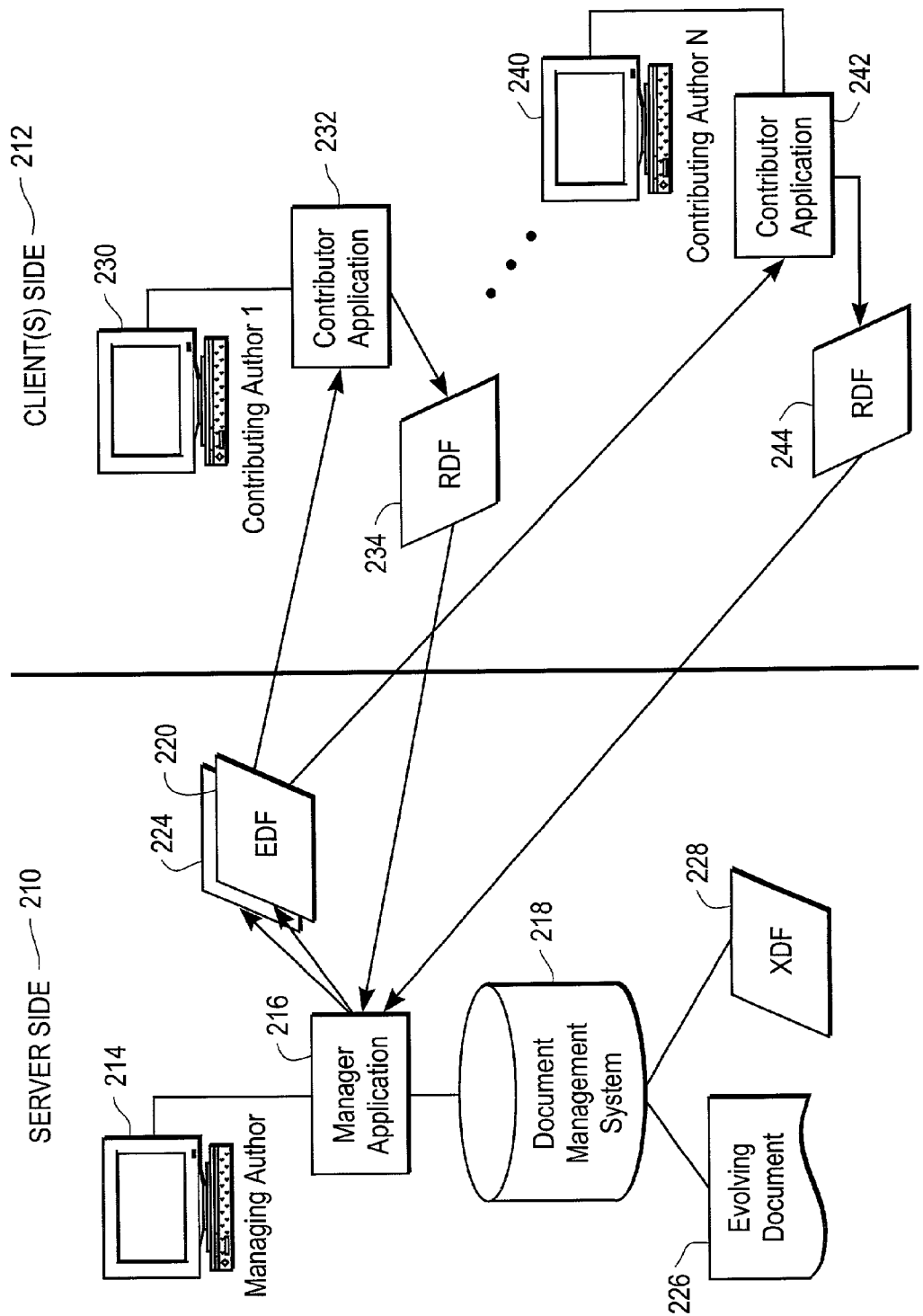
FIG. 2 shows a schematic block diagram of one embodiment of the present intention.

FIG. 2 shows a schematic block diagram of one embodiment of the present intention. Server side 210 is coupled to the managing author's computer 214. Client side 212 includes one or more contributing author's computers, for example, contributing author 1's computer 230 to contributing author N's computer 240. The managing author's computer 214 accesses the manager application 216 to first select an original document from the document management system 218, and then the manager application 216 produces one or more replicas of the original document. Each replica is put in an EDF file, e.g., 220 and 224. The manager application 216 is connected to a document management system 218, that stores the evolving document 226, which includes the original document and proposed changes accepted by the managing author, and the eXtended Document Format (XDF) 228 file, that includes keeping track of revisions and responses, including information on all changes.

The manager application 216, after it creates, for example, EDF file 220, sends EDF file 220 to a contributor application 242 running on contributing author's computer 240. Another EDF file 224 may be sent to another contributor application 232 running on the contributing author's computer 230. The contributing authors edit their respective replicas and send proposed changes via RDF files, e.g., 234 and 244, to the manager application 216. The manager application 216 extracts the proposed changes to the original document and displays them to the managing author 214. The managing author 214 selects none, some, or all of the proposed changes, and these are incorporated into the evolving document 226.

Figure 3:
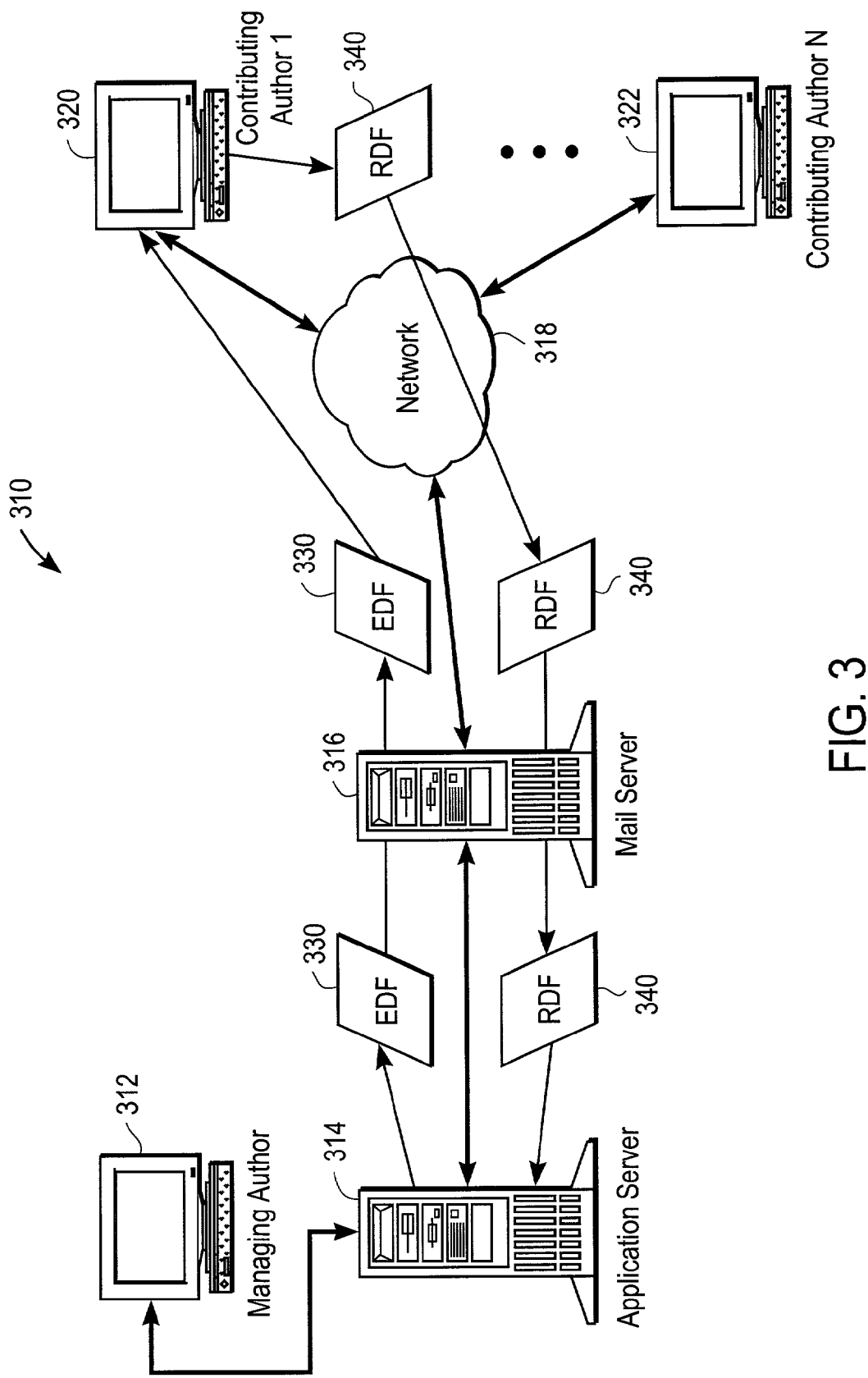
FIG. 3 is an overall system diagram of another embodiment of the present intention.

FIG. 3 is an overall system diagram of another embodiment of the present intention. The computer 312 operated by the managing author is connected to an application server 314 which runs the manager application 216. Either the application server 314 or another server (not shown), but connected to the application server 314, runs document management system 218. The application server 314 is connected to an e-mail server 316 that receives an e-mail message with a replica of the original document contained in an EDF file 330 attached. The e-mail server 316 sends the e-mail to one or more contributing authors, e.g., contributing author 320 to contributing author 322, via network 318. For simplicity of illustration, only one EDF e-mail 330 is shown going to one contributing author 320 via network 318. Contributing author 320 edits the replica and sends an edited replica via an RDF file 340 back to mail server 316 via network 318. The mail server 316 then sends the RDF file 340 to the application server 314. The manager application 216 then extracts the proposed changes from the contributing author 320 and displays it on managing author's 312 computer. The managing author 312 then selects a change and the manager application 216 incorporates that selected change into the evolving document 226.

File Formats

Preferably the present invention employs an EDF (Enhanced Document Format) to significantly reduce the dangers and problems involved in collaborating on documents. The EDF replica is a copy of the managing author's original document designed for use in document collaboration over unsecure communications networks, for example, the Internet. The EDF replica contains no metadata. The EDF replica plus some eXtensible Markup Language (XML) information forms the EDF file, which is then compressed and encrypted automatically, e.g., using 128-bit encryption.

Metadata is information hidden inside computer files. In the case of Microsoft® Word (hereinafter called Word) files, metadata includes information such as who the author is, who the author works for, and the changes the author has been making to the document. Inadvertently allowing public access to this information may reveal sensitive business or legal information.

In a preferred embodiment of the present invention, the managing application creates EDF replicas, which remove the following metadata from the Word files: initials of the author (Word retains this information from when the author first registers his copy); b) company name (again, this information is entered when the author first installs Word); name of the computer; name of the network server or local hard drive; file properties and file summary information; embedded object information (when the document contains embedded objects, such as pictures or other objects, the path to the object can be included as metadata); names of previous authors of the document (this information is used to identify authors as part of the Track Changes facility of Word); document revisions (when Track Changes is turned on, Word will compile a history of changes made to the document); document versions (each Word file can contain several versions of the actual text); and hidden text (hidden text can include references to bookmarks, glossary, index and table of contents markers. It can also include casual comments inserted by reviewers).

Figure 9:
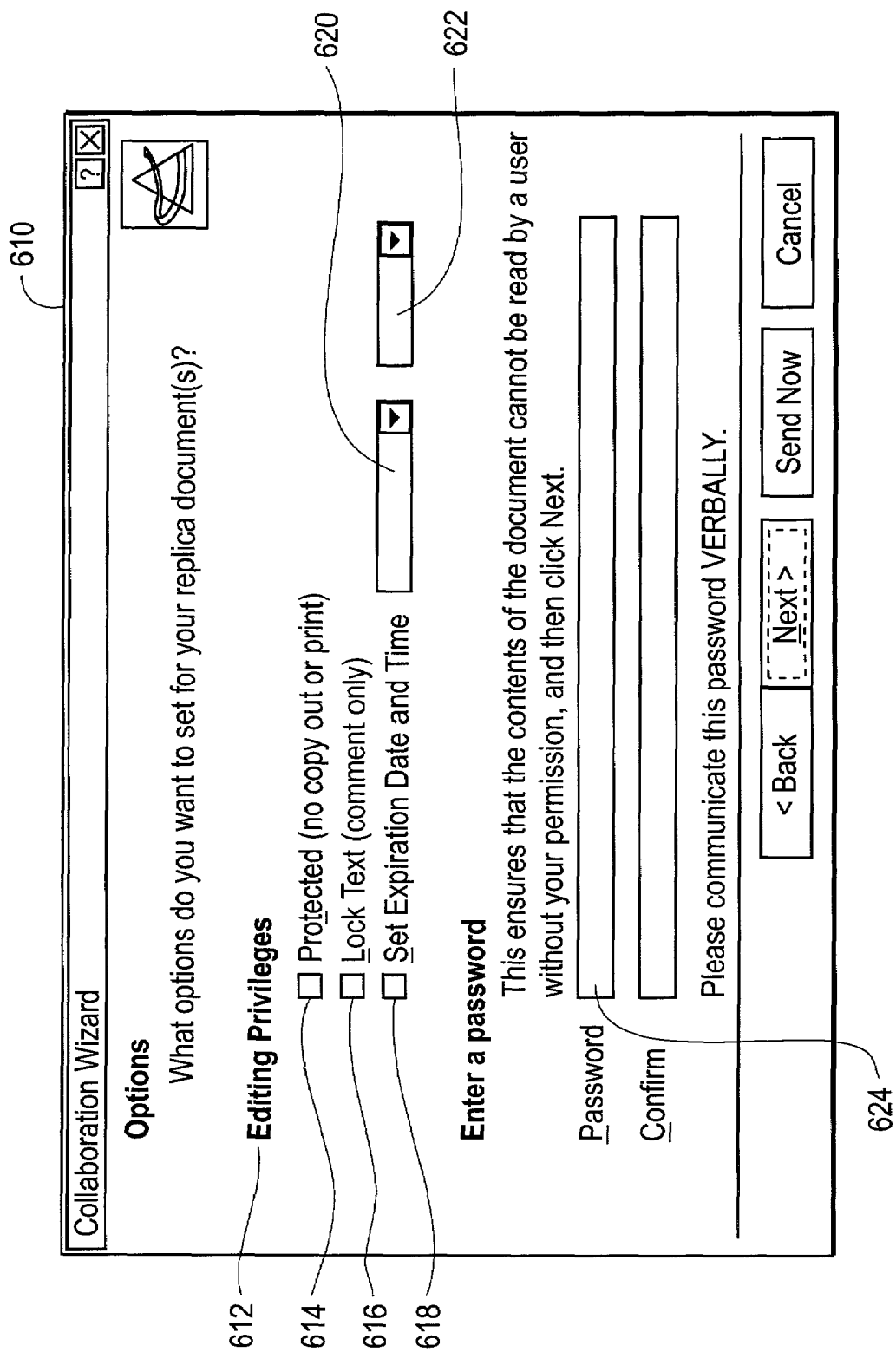
FIG. 9 is a display window allowing a user to select editing privileges and set a password of an aspect of the present invention.

The XML information of the EDF file includes the e-mail address of the managing author for return of the response from the contributing author and the editing privileges 612 of FIG. 9 (Disable_Export corresponding to protected 614, Disable_Edit_Docs corresponding to lock text 616, and Edf_Expiry_Date corresponding to set expiration date and time 618).

FIG. 4 is a Document Type Definition (DTD) for the XML of the EDF file of an aspect of the present invention. A code snippet of Element 350 is given below:

<!ELEMENT CustomData (Edit, Print, CopyPaste, FormatChange, Export, W97Compatability, RtfSaved, Disable_Export, Disable_Edit_Docs, Edf_Expiry_Date, OriginalDocumentID, CollaborationDocumentID, RevisionName, SenderEmailAddr, SenderName, ReturnType, ReturnAddress)>

"Disable_Export" if "1" allows no copying out or printing of the replica and if "0" allows all exporting rights; "Disable_Edit_Docs", if "1" allows no editing (only commenting) of the replica, and if "1" full editing is allowed. "Edf_Expiry_Date" gives the date when the EDF will expire (if there is no date then the EDF will not expire). The "OriginalDocumentID" has the path and filename to the original document. The CollaborationDocumentID has the path and filename of the XDF file. The "RevisionName" has the filename of the original document and the revision number. "SenderName" has the managing author's name, and "SenderEmailAddr" has the managing author's e-mail address. "ReturnType" gives how the response is to be returned, e.g., e-mail. "ReturnAddress" gives who the response is to be returned to, e.g., the managing author.

The Response Document Format (RDF) is the format used by the contributing authors to send their proposed modifications back to the managing author. An RDF file includes information which identifies its author (SenderName, i.e., sender name, e.g., contributing author, and SenderEmailAddr, i.e., contributing author's e-mail address) to the managing author, and a unique response ID number (UniqueID).

FIG. 5 is a Document Type Definition (DTD) for the XML of the RDF file of another aspect of the present invention. A code snippet of Element 354 is given below:

<!ELEMENT CustomData (Edit, Print, CopyPaste, FormatChange, Export, W97Compatability, RtfSaved, Disable_Export, Disable_Edit_Docs, OriginalDocumentID, CollaborationDocumentID, RevisionName, ReturnType, ReturnAddress, UniqueID, SenderName, SenderEmailAddr)>

XDF: Extended Document Format. This is the central file in the collaboration. It is created by the Manager Application at the beginning of the process and houses all the data relating to the collaboration. All responses (RDFs) are kept here when they have been sent back to the managing author. This central file has an XDF extension and is located in the same directory as the original document or associated with the original document in a document management system.

The XDF file includes a plurality of data streams that are arranged in a hierarchical structure, e.g., an expandable object tree (e.g., document, revision, response) with the data streams as the leaf nodes. The data streams include "DataBlock," "Custom Data," "Redline Data," Change Data," and "Original File". The "DataBlock" stream is attached to almost all objects in an XDF file and includes properties dependant on the type of object it is attached to. For example, for a revision the "DataBlock" stream includes the title of the revision and a unique identifier for the revision. For a response, the DataBlock stream also includes compressed XML data having the status of each change described in the "Change Data" stream. The "Custom Data" stream is attached to each object in the XDF and it stores customizable properties that have been added to the object by a user. The "Redline Data" stream is attached to each response object and contains the redline, i.e., mark-up, shown in the tab view of the Manager GUI (comparison window 1014 of FIG. 16) for that response, in compressed RTF format. The "Change Data" stream is also attached to each response object and contains a compressed XML stream which describes all the changes in that response. The "Original File" stream is attached to each revision. It stores the document in compressed format, that was distributed as the unedited replica for that revision. When a response is returned, this unedited replica is used as the basis for the reconstruction of the edited replica from the binary difference file.

In an aspect of the present invention each time a round of EDF replicas is sent by the managing author, based on a version of the original document which has been modified, a new revision is created. A revision is a version of the original document stored inside the collaboration file, i.e., the XDF file. The manager application software is designed to let the managing author continue to edit his original document, after he has sent EDF replicas out for review. Thus the managing author may send EDF replicas to a first set of collaborators from revision 1. The managing author could then keep editing his original document. If he/she then decides to send further EDF replicas to a second set of collaborators, they are sent from revision 2. When the first set of collaborators return their edited replicas, they are associated with revision 1. The edited replicas from the second set of collaborators are associated with revision 2.

The manager application maintains version control by labeling all EDF replicas sent and all RDF responses received from the contributing authors. For example, the field RevisionName 352 in the XML DTD for the EDF file (FIG. 4) would have the filename and revision number, e.g., "Test document Revision 1". The RDF response has the same RevisionName 356 (FIG. 5) of, e.g., "Test document Revision 1". Thus the manager application can link up the correct version of the replica with the response.

Figures 1, 6:
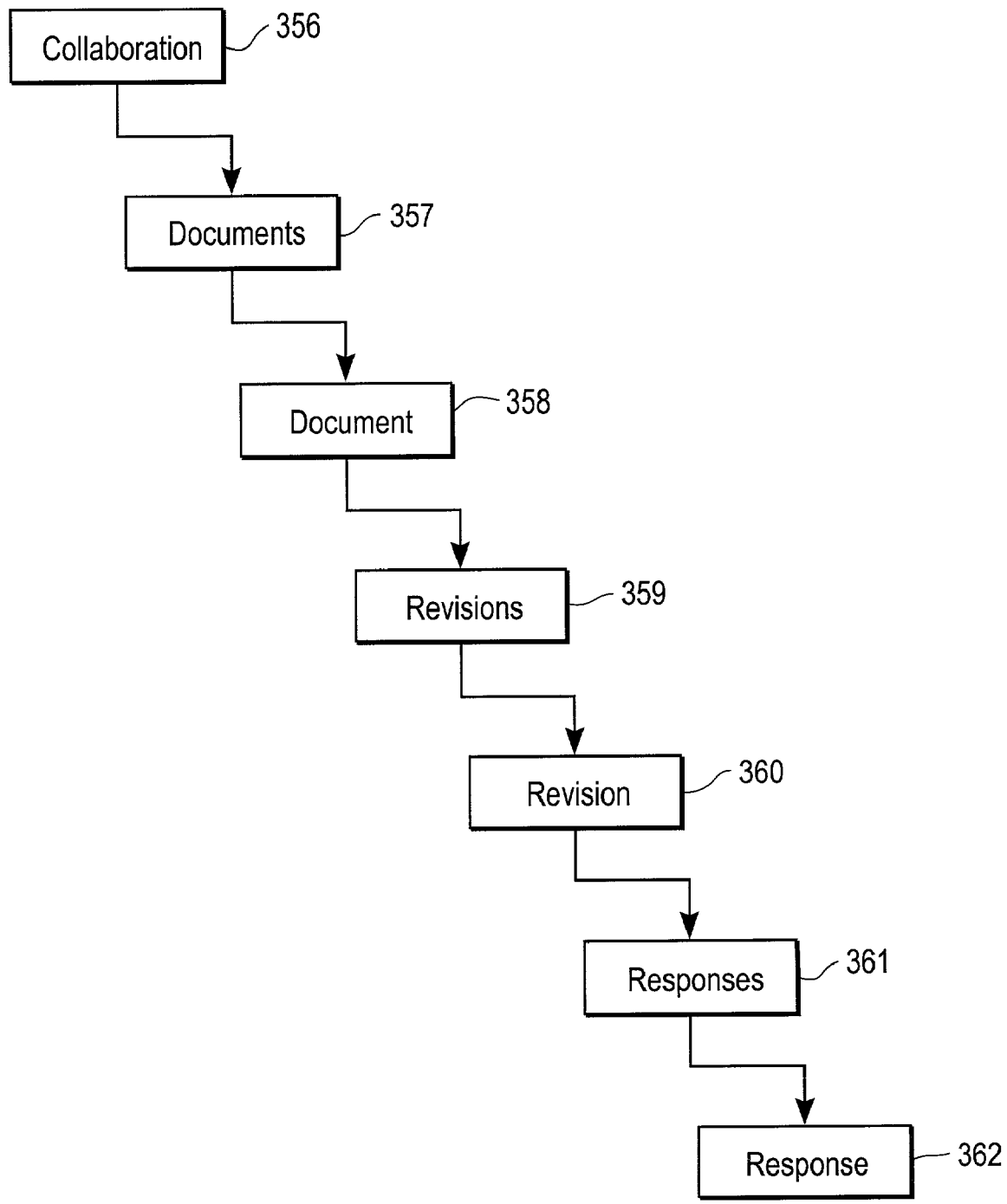
Figures 2, 6:
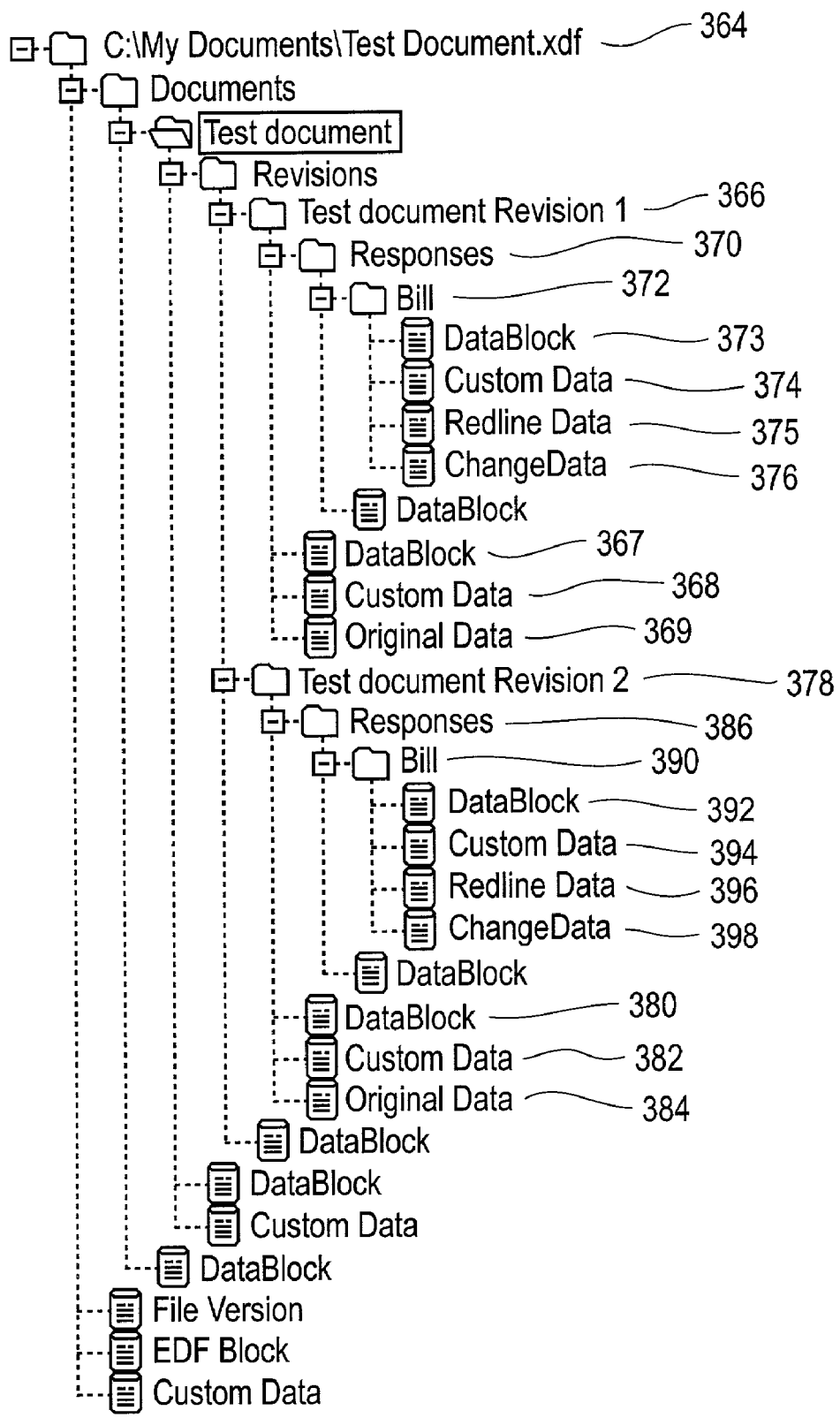

FIG. 6-1 is an object structure of the XDF file of an aspect of the present invention. A collaboration 356 is the root object of the XDF file and is created by the manager application. The collaboration 356 includes a documents object 357, where the documents object 357 includes a document, e.g., document 358. The document, e.g., 358, is an original document initially selected by the managing author from the DMS. The document object, e.g., 358, has a revisions object 359, where each revision, e.g., revision 360, includes an original document or a modified original document (i.e., an original document with incorporated changes), sent by the managing author to one or more contributing authors. Each revision object, e.g., 360 has a responses object 361 having zero or more responses, e.g., response 362. Each response object, e.g., 362 includes a response from a contributing author.

FIG. 6-2 is an example of a graphical illustration of the structure of the XDF file (e.g., Test Document.xdf 364) of yet another aspect of the present invention. For illustration purposes, a "Test document" is selected by the managing author as the initial original document, where the objects assigned in the XDF file 360 are given in parentheses. This test document is replicated (Test Document Revision 1 366 with accompanying DataBlock 367, Custom Data 368 and Original File 369), and sent to a contributing author, e.g., Bill, for review and editing. Bill edits the test document and returns a response (Bill 372 with accompanying DataBlock 373, Custom Data 374, Redline Data 375, and Change Data 376). The managing author accepts some of the changes proposed by Bill and these are incorporated into the test document. The managing author then sends this revised test document (Test document Revision 2 378 with accompanying DataBlock 380, Custom Data 382 and Original File 384) to Bill for further comment. Bill again edits this revised test document and sends a response (Bill 390 with accompanying DataBlock 392, Custom Data 394, Redline Data 396, and Change Data 398). Again the managing author accepts Bill's proposed changes, and these are incorporated into the test document. Thus the XDF file is a file history of all the versions/revisions and their changes.

Collaboration Process And System

Figure 7:
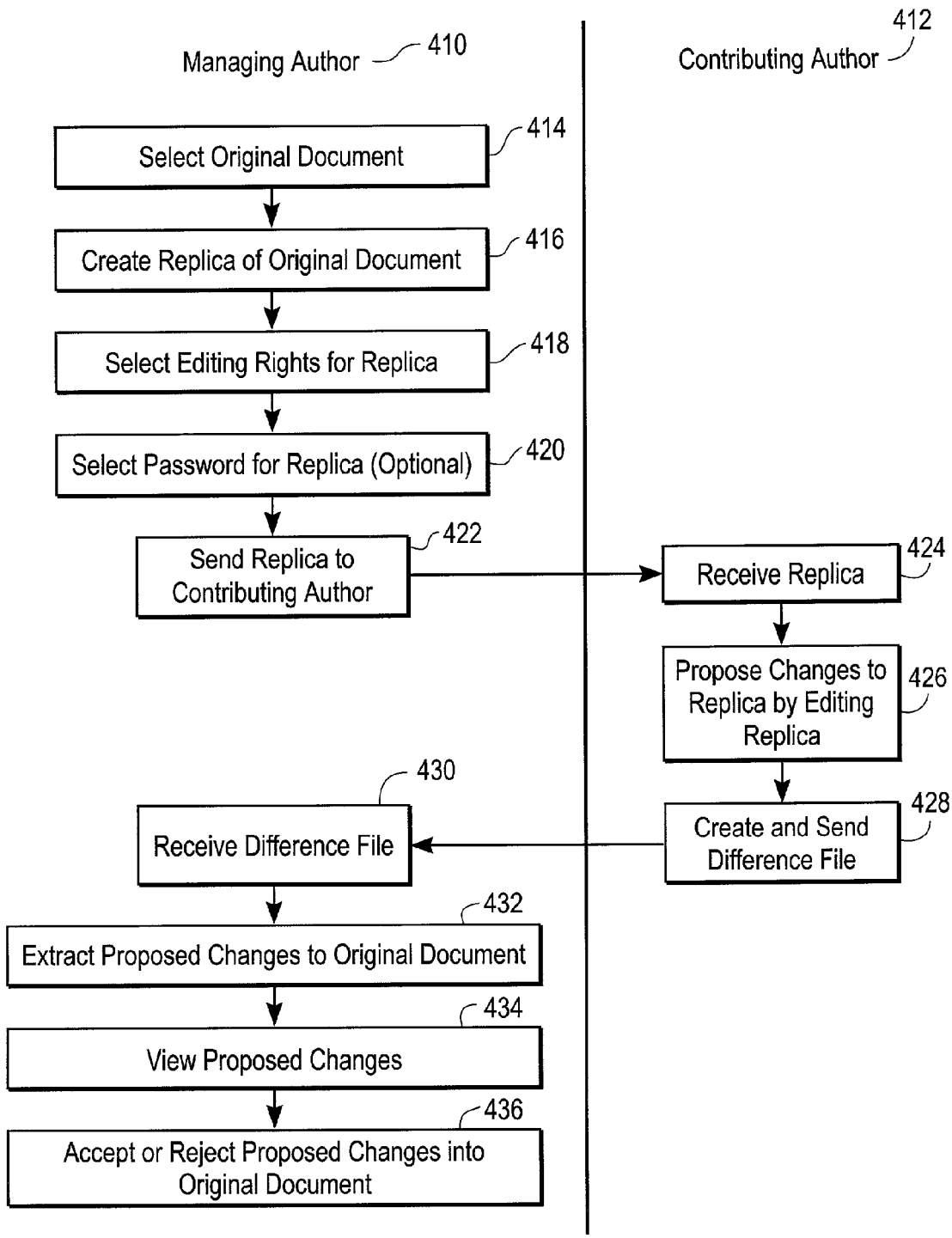
FIG. 7 is a simplified flowchart illustrating the collaboration process of another embodiment of the present intention.

FIG. 7 is a simplified flowchart illustrating the collaboration process of an embodiment of the present intention. There is one managing author 410 and one or more contributing authors. For simplicity of illustration, only one contributing author 412 is shown in FIG. 4. The managing author 410 selects an original document from the DMS 218 (step 414). At least one copy or replica is created of the original document by the manager application 216 (step 416). The managing author 410 then selects the editing rights for the replica (step 418). At step 420 an optional password may be selected to protect the replica. The replica is included as part of an EDF file and is sent encrypted to the contributing author 412 (step 422). The contributing author 412 receives the replica at step 424. At step 426 contributing author 412 proposes changes to the replica by editing the replica. Then at step 428, a difference file is created using the unedited replica and the edited replica. This difference file is sent as is part of a RDF response to the managing author 410. At step 430 the managing author 410 receives the difference file. The difference file is processed and proposed changes from contributing author 412 are extracted (step 432). Managing author 410 than views the proposed changes at step 434. At step 436 managing author 410 either accepts or rejects the proposed changes and the accepted changes are incorporated into the original document by the managing application. Thus the original document becomes an evolving document with new accepted changes further modifying the evolving document. Note there is no change information shown in the evolving document.

Figure 8:
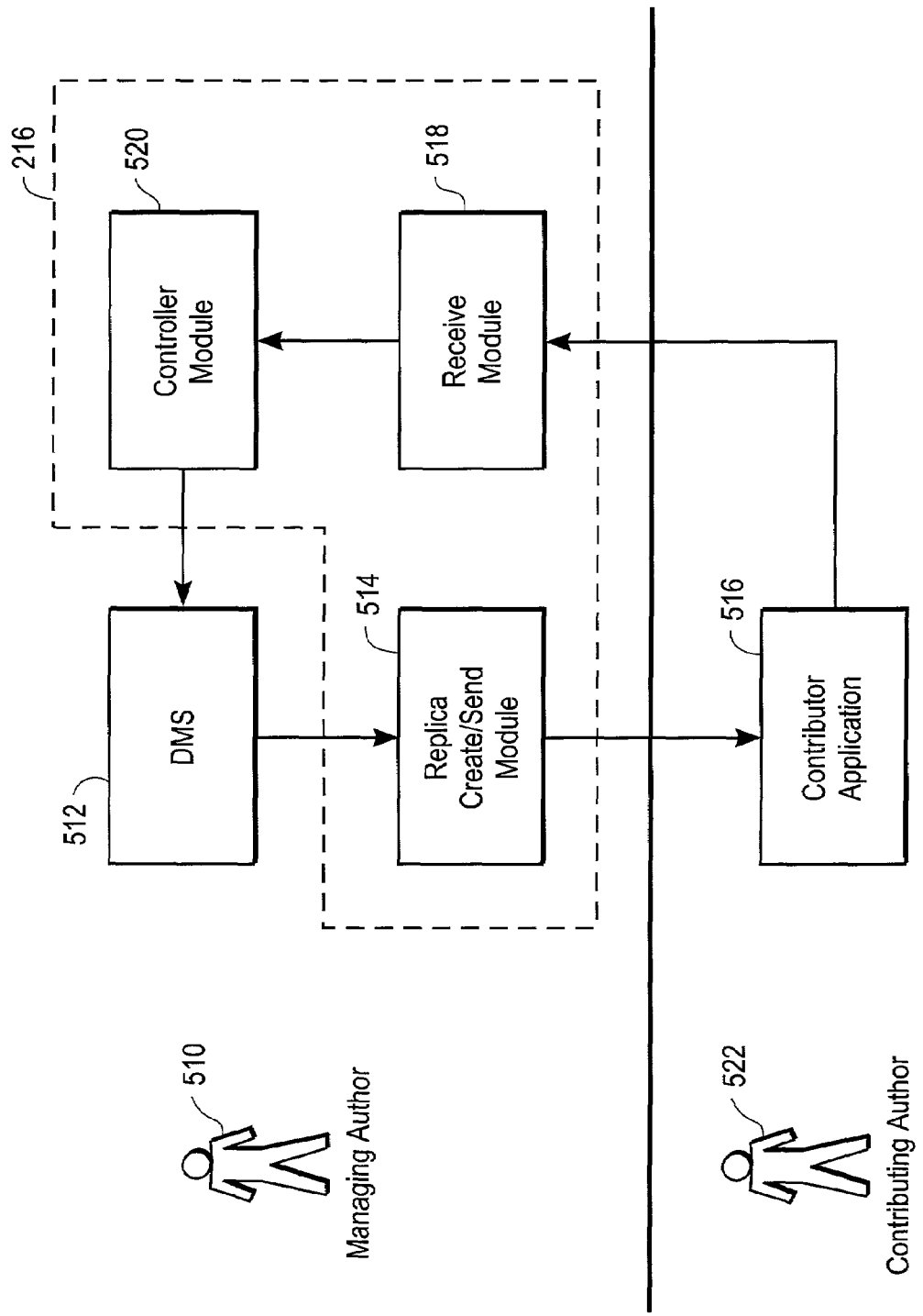
FIG. 8 is a block diagram of the modules involved in the collaboration process of an embodiment of the present invention.

FIG. 8 is a block diagram of the modules involved in the collaboration process of an embodiment of the present invention. The managing author 510 interfaces with the following software modules: the document management system (DMS) 512, replica create/send module 514, receive module 518 and controller module 520. The replica create/send module 514, receive module 518 and controller module 520 are part of the manager application 216. A contributing author 522 interfaces with the contributor application 516. To start the collaboration process an original document is first selected by the managing author either from the DMS 512 or from the local file system. The replica create/send module 514 is then called to create the EDF files, where an EDF file includes a replica of the original document and XML information. The EDF files are encrypted and sent to one or more contributing authors (FIG. 5 shows one contributing author 522 of these contributing authors, if there are more than one contributing author). The contributor application 516 receives the EDF file and extracts the replica. The contributing author 522 edits the replica and may insert comments using the contributor application 516. The edited replica is used to create a difference file. The RDF file, which includes the difference file and other XML information, is sent to the receive module 518 at the managing author's site. Next, the difference file along with the original document is used to display the contributing author's 522 proposed changes to the managing author 510. The managing author 510 then selects the changes he/she wants, and the selected changes are then incorporated into an evolving document in the DMS 512. The evolving document includes the original document with the selected changes incorporated into it and is dynamically displayed to the managing author 510 as the proposed changes are selected. For multiple contributing authors, the proposed changes for each contributing author are displayed to the managing author 510, the changes selected are then incorporated into the evolving document in the DMS. Each selected change is immediately displayed to the managing author 510 after it is selected. Changes may also be undone and removed from the evolving document. The evolving document may also be edited manually. Thus the original document dynamically evolves to the final document by incorporating proposed changes selected by the managing author 510.

Embodiments of four software programs will now be described: the replica create/send module 514, the contributor application 516, the receive module 518, and the controller module 520.

An embodiment of the replica create/send module 514 is a software program used by the managing author 510 to generate replicas of the original document, and e-mail them to the contributing authors. The replica create/send module 514 performs the replica create and replica send, e.g., e-mail, functions.

In one aspect of the present invention the replica create function includes: choosing the replica document format, selecting editing rights, including the restricting of editing rights and setting an expiration date, and optionally selecting a password. The managing author first selects the document format of the replica. By default Enhanced Document Format (EDF) is set. The managing author may opt to use the following other formats: Word (.DOC), Text (.TXT), and Rich Text Format (.RTF). If one of these other formats is chosen, there are certain disadvantages, in comparison to the EDF format. For example, the editing rights of contributing authors cannot be restricted, an expiry time for the file cannot be set, use of ordinary file formats does not remove the risk of formatting corruption, and the contributing authors need to use the same version of word processor as the managing author, if they are to see the files properly.

FIG. 9 is a display window 610 allowing a user to select editing privileges 612 and set a password 624. When the format for the replica is EDF, then, the ability of contributing author(s) to edit the EDF replica(s) may be restricted by the managing author by selecting one or more of the editing privileges 612. The default is full editing rights. Exemplary options are: protected (no copy out or print) 614, where the contributing author(s), can only copy out of or paste into the replica, items in the replica itself, cannot print the replica, and cannot save the replica in other than EDF format; lock text (comment only) 616, were the contributing author(s) cannot edit the replica(s) (they may only add comments); and set expiration date and time 618, where the contents of the EDF are not readable, i.e., the file cannot be opened, after a certain date 620 and/or time 622. Contributing authors are informed of their restrictive editing privileges in the body text of the e-mail they receive.

Before the replica document is e-mailed it can be password-protected 624. The default is no password. This is an added security feature, as the EDF file is automatically encrypted, whether or not, a password is chosen. The decryption of the EDF file, in one embodiment of the present invention, may only be done by the contributor module 516.

After the replica is created (or while the replica is being created), XML data, including the editing privileges and managing author's e-mail address, is added in order to form the EDF file. The EDF file is then compressed and encrypted, e.g., using the standard 128-bit encryption key and added as an attachment to an e-mail message. In another embodiment the EDF file may only be encrypted but not compressed. Other embodiments use other key sizes and use other methods of encryption.

Figure 10:
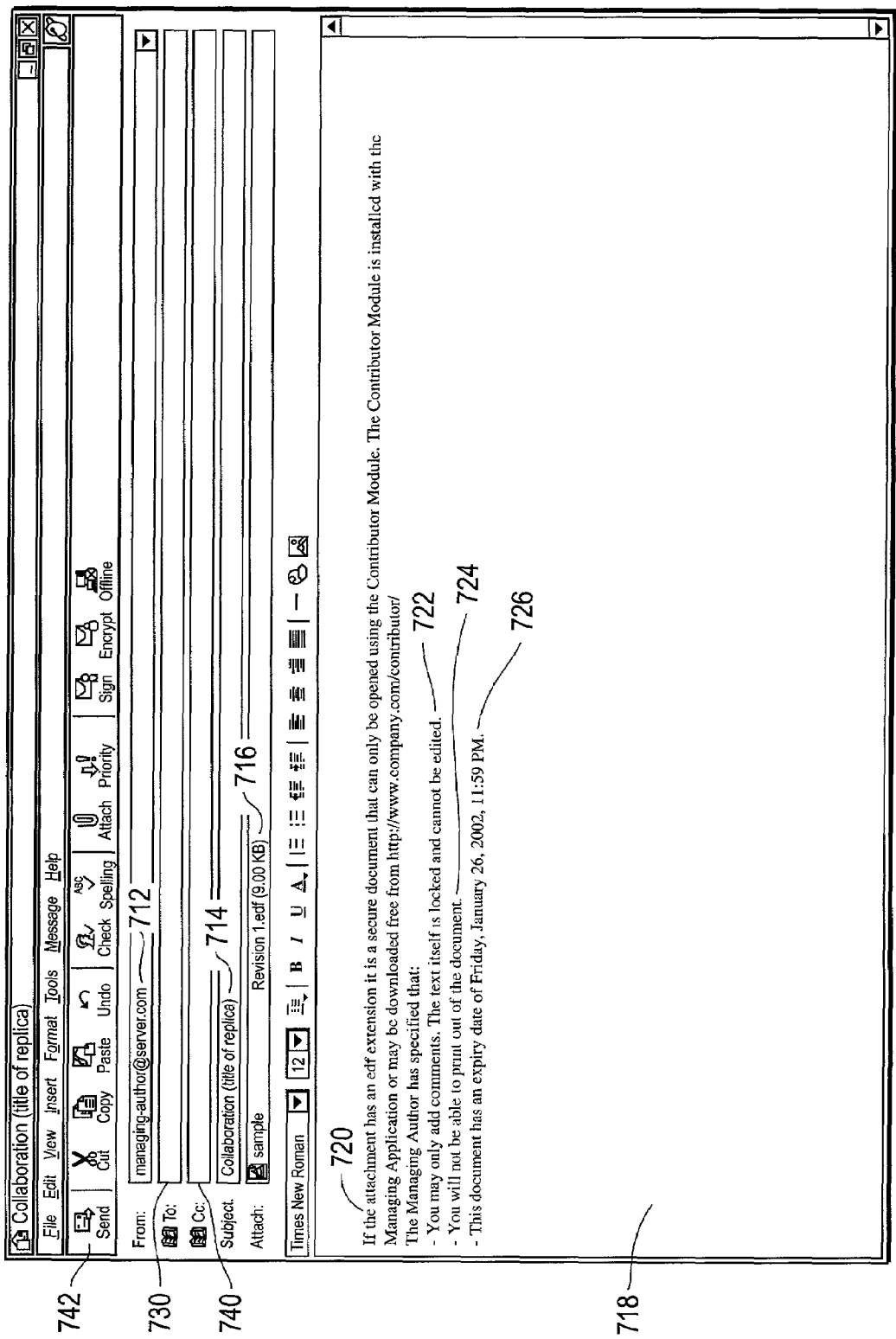
FIG. 10 is an e-mail message that is automatically created with the EDF file as an attachment of another aspect of the present invention.

FIG. 10 is an e-mail message that is automatically created with the EDF file as an attachment of another aspect of the present invention. The replica create/send module 514 creates the e-mail using the managing author's default e-mail system. The e-mail message 710 has automatically generated the "From" address 712, e.g., "managing_author@server.com," a "Subject" 714, e.g., "Collaboration (title of replica)," and one or more predetermined messages in the text section 718 of the e-mail message 710. In addition the EDF file "sample revision 1.edf" is attached as shown by item 716. The text section 718 includes a warning 720 "that if the attachment has an EDF extension it is a secure document that can only opened by using the contributor module". The text section 718 may further include warnings due to restrictive editing, e.g., "you may only add comments. The text itself is locked and cannot be edited" 722, or "you will not be able to print or copy out the document" 724, or "this document has an expiry date of Friday, Jan. 26, 2002 11:59 PM" 726, or a combination of one or more of these warnings.

The managing author enters the e-mail address of the intended recipient, i.e., contributing author, in the "To:" field 730 and the e-mail address of additional carbon copy recipients in the "Cc:" field 740. Other text may be entered in the subject header field 714 by the managing author in addition to the text "Collaboration" followed by the name of the file being sent in parentheses. Other text may also be entered into the text field 718 by the managing author. Once the necessary fields have been filled in, clicking 'Send' 742 will send the e-mail to an outbox, from where it will be dispatched to the intended recipients(s) according to the procedures used by the e-mail program.

The contributor application 516 receives the e-mail from the replica create/send module 514 (FIG. 8) containing the unedited replica. The contributor application 516 is used by the contributing author(s) to edit the replica document. Some features include: allowing contributing author(s) to examine the replica document as though it were the original document, automating the return of the edited replica document to the managing author, and contains metadata to ensure that when the edited replica document is returned to the managing author, it is associated with the correct collaboration.

Figure 11:
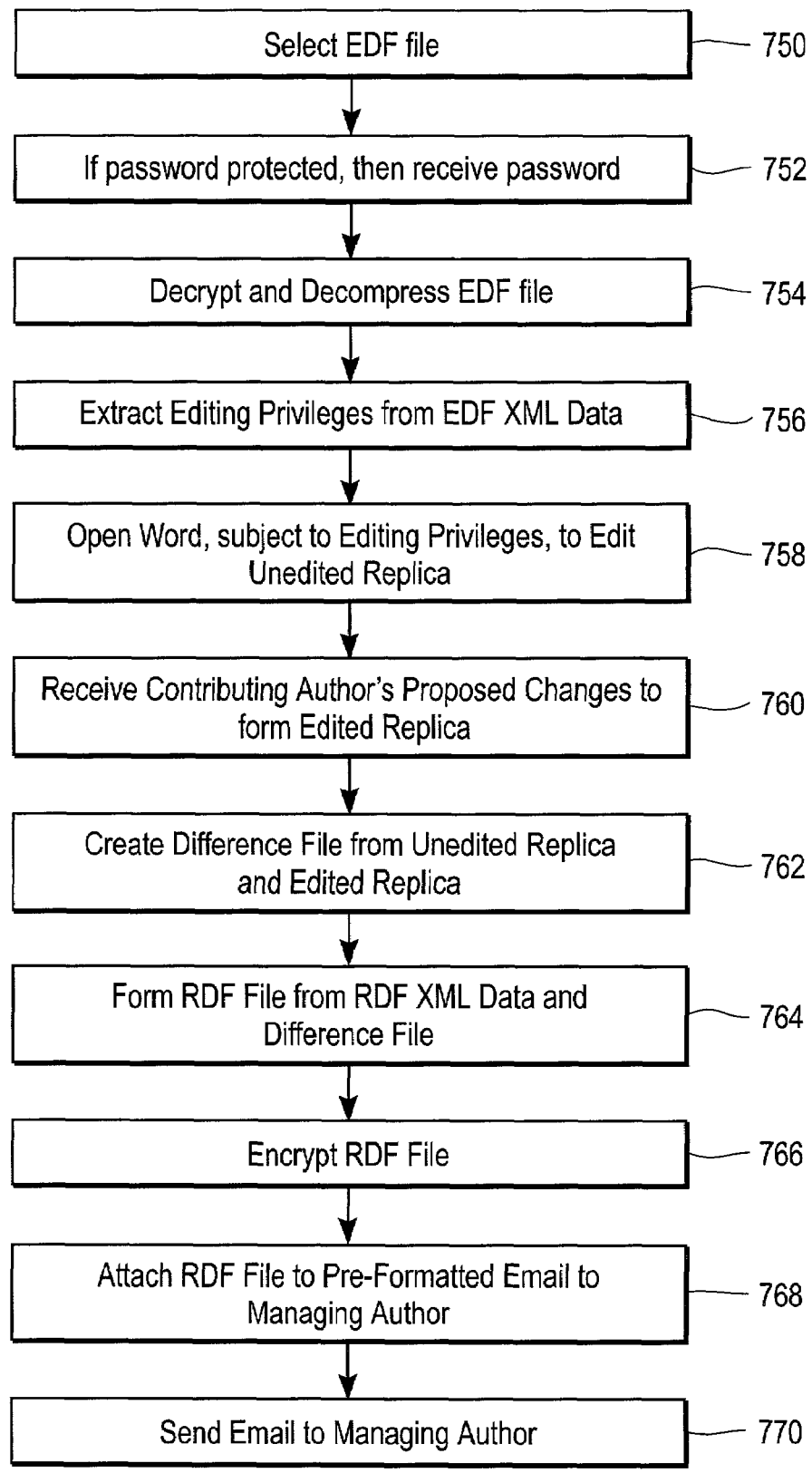
FIG. 11 is a simplified flowchart of the process of editing a replica by a contributing author of an embodiment of the present invention.

FIG. 11 is a simplified flowchart of the process of editing a replica by a contributing author of an embodiment of the present invention. At step 750 an EDF file that was received from the managing author is selected. If password protected, then the contributor application 516 requests and receives a password from the contributing author (step 752). The contributor application 516 then decrypts and decompresses the EDF file (step 754). At step 756 the editing privileges are extracted from the XML data, e.g., FIG. 4, in the EDF file. From FIG. 9 the editing privileges 612 where previously set by the managing author. The contributor application 516 processes the XML and at step 758, opens Word with the restricted editing privileges, if set. For example, copy out or printing may be restricted, or only commenting may be allowed, or the document may not open because the expiration date/time has been exceeded. At step 760 the contributor application 516 receives the proposed changes to the replica, i.e., an edited replica is formed. The contributing author may view these proposed changes on a display such as that given in FIG. 13. At step 762 a difference file is created using the unedited replica and the edited replica. The difference file has, in effect, instructions on how to reconstruct the edited replica from the unedited replica. The RDF XML data, including the contributing author's, i.e., sender's, name and e-mail address, is added to the difference file to form the RDF file (step 764), and then the RDF file is encrypted (step 766). The encrypted RDF file is attached to an e-mail automatically created by the contributor application 516 (step 768) and the e-mail is sent to the managing author (step 770).

In an alternative embodiment of steps 764 and 766, only the RDF XML data is encrypted. The encrypted RDF XML data is then combined with the unencrypted difference file to form the RDF file. The RDF file is attached to an e-mail automatically created by the contributor application 516 (step 768) and the e-mail is sent to the managing author (step 770).

Figure 12:
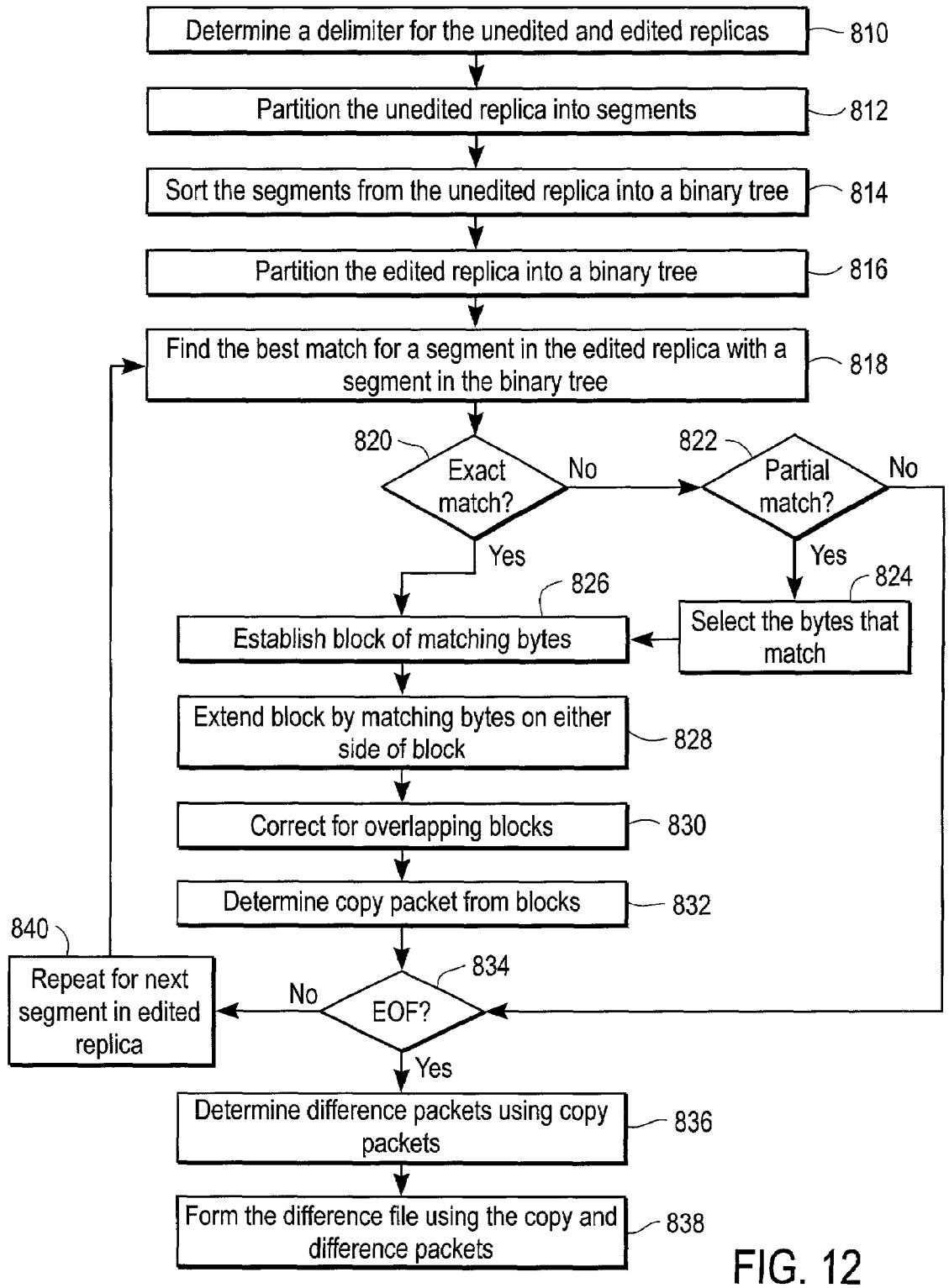
FIG. 12 is an flowchart of the creation of the difference file of an embodiment of the present invention.

FIG. 12 is a flowchart of the creation of the difference file of step 762 of FIG. 11 of an embodiment of the present invention. At step 810 a delimiter that is used to partition the edited and unedited replica into segments is selected. The delimiter is picked for each document, e.g., unedited replica, by a statistical process to try to avoid too many very short or very long segments. The same delimiter is used for both documents in a pair, but for different pairs of documents the delimiter may differ. At step 812 the unedited replica is partitioned into segments, using the delimiter. Additional segments are also created for contiguous runs of matching bytes, for example, a series of 7 bytes each containing the value zero would be a segment. At step 814 the unedited replica segments are sorted into a binary tree.

The binary tree in one embodiment is based on a "less than" function, i.e., one segment is determined to be "less than" another segment based upon length and content. This function conforms to the mathematical '<' operator. For example if A<B and B<C, then A<C, were A, B, and C are segments. Once all the segments in the unedited replica are built into the binary tree, then a given segment in the edited replica can be searched for a match in the binary tree in order log.sub.2 N time (were N is the number of segments in the binary tree). In one aspect this binary tree has a dictionary like ordering. So that if the documents consisted only of plain text, a segment containing the text 'bee' would appear after 'be' but before 'beg.'

At step 816 the edited replica is partitioned into segments similar to step 812. Next each segment in the edited replica is compared with the segments in the binary tree. In one embodiment each segment in the edited replica is compared. In an alternative embodiment some segments may be skipped as it may not be necessary to compare them to segments in the binary tree. The end result is to get a series of copy packets and difference packets. The copy and difference packets are part of the difference file and will be used by the manager application to reconstruct the edited replica from the unedited replica. A copy packet indicates that a copy of a portion of the unedited replica should be inserted at the current position in the edited replica, that is being reconstructed. The copy packet specifies the position and size (in bytes) of the portion of the unedited replica to be inserted. A difference packet indicates that a stream of bytes from the edited replica, which were not found in the unedited replica, should be inserted at the current position in the edited replica that is being reconstructed. The difference packet contains the size of the stream of bytes to be inserted as well as the stream of bytes itself.

At step 818 the best match for a segment in the edited replica with a segment in the binary tree is found. The best match is generally considered to be the longest match, since trying to minimize the size of the difference file is a desirable goal. If there is an exact match then the best match is found. If there is a partial match, then only some of the bytes in each segment may match. In one embodiment, the tree is arranged so that the last node visited is a candidate for the best match for the segment being searched for. For example, assume we are searching for "kv;", which doesn't exist in the tree, but a 'partial' match "kvkq;" does exist. The binary tree is arranged, in this case, so that "kvkq;" will be the last node visited before determining that there is no exact match for "kv;", thus the match of the first two bytes may be a copy block.

At decision 820, if there is an exact match of the edited replica segment, then a block of matching bytes is established (step 826). At step 828 this block is then grown or extended in both directions in the unedited replica and edited replica providing the bytes continue to match. If there is not an exact match, then the decision 822 is whether there is a partial match. If yes, then the subset of the bytes in the unedited replica and edited replica that match are selected for the block of step 826. If there is no partial match then the End Of File (EOF) 834 of the edited replica file is checked. If there are more edited replica segments to compare, then the next segment in the edited replica file is examined (step 840) and the process repeats at step 818.

While extending the block as part of step 828, there may be overlap with other block(s). The overlap is corrected (step 830), and at step 832 a copy packet is determined. If there are more segments to be compared then at step 840 the next segment in the edited replica is examined. If all the segments in the edited replica have been examined, at then the difference packets are determined at step 836. A difference packet occurs between two copy packets. At step 838 the copy and difference packets in sequential order form the difference file.

As a simple example of forming a difference file, assume each character is a byte and semi-colon ";" is the delimiter. Let the unedited replica and edited replica have the following characters:

| position | 0 | 5 | 10 |
|---|---|---|---|
| unedited replica | a b c d ; e f g ; l m ; n ; | | |
| edited replica | a b c d ; h j ; k k ; l m ; n ; | | |

The segment "abcd;" in the edited replica matches "abcd;" in the unedited replica. This gives a copy packet of five bytes starting at position 0 in the unedited replica, i.e., "abcd;", or [0,5].

The next segment in the edited replica to match is "lm ;". Once the process finds a matching block it tries to grow that block in both directions in the replica and edited replica providing the bytes continue to match. So the match between "lm ;" would be found and extended backwards a single byte and forwards 2 bytes to give a total match of ";lm; n;" or 6 bytes. Thus this copy packet is [8,6].

The difference packet would be the stream of bytes between the two copy packets or "hj; kk;" or [hj; kk]. Thus the final difference file is: [0,5] [hj; kk][8,6].

The difference file has several advantages over sending the edited replica back to the managing author. First, a difference file is typically smaller in size than the document itself. And second, the comparison of the edited and unedited replicas has been done at the client, i.e., distributive processing. Since there may be many contributing authors, i.e., clients, and only one server, e.g., managing author, part of the comparison workload has been off-loaded to the client. Thus the server can be a computer similar to the client, i.e., it is easy to interchange server and client computers.

In the alternate embodiment of not encrypting the difference file, there is the additional advantage of saving encryption time. In certain cases, e.g., where the inserted text by the contributing author is small or the security risk of interception or tampering is low, there may be no need to encrypt the difference file. Since the unedited replica is needed before the difference file can be full deciphered, and since the unedited replica, accessible by the public, e.g., in e-mail over the Internet from the managing author, is encrypted, sending the difference file unencrypted provides, in certain cases, the necessary security protection.

Figure 13:
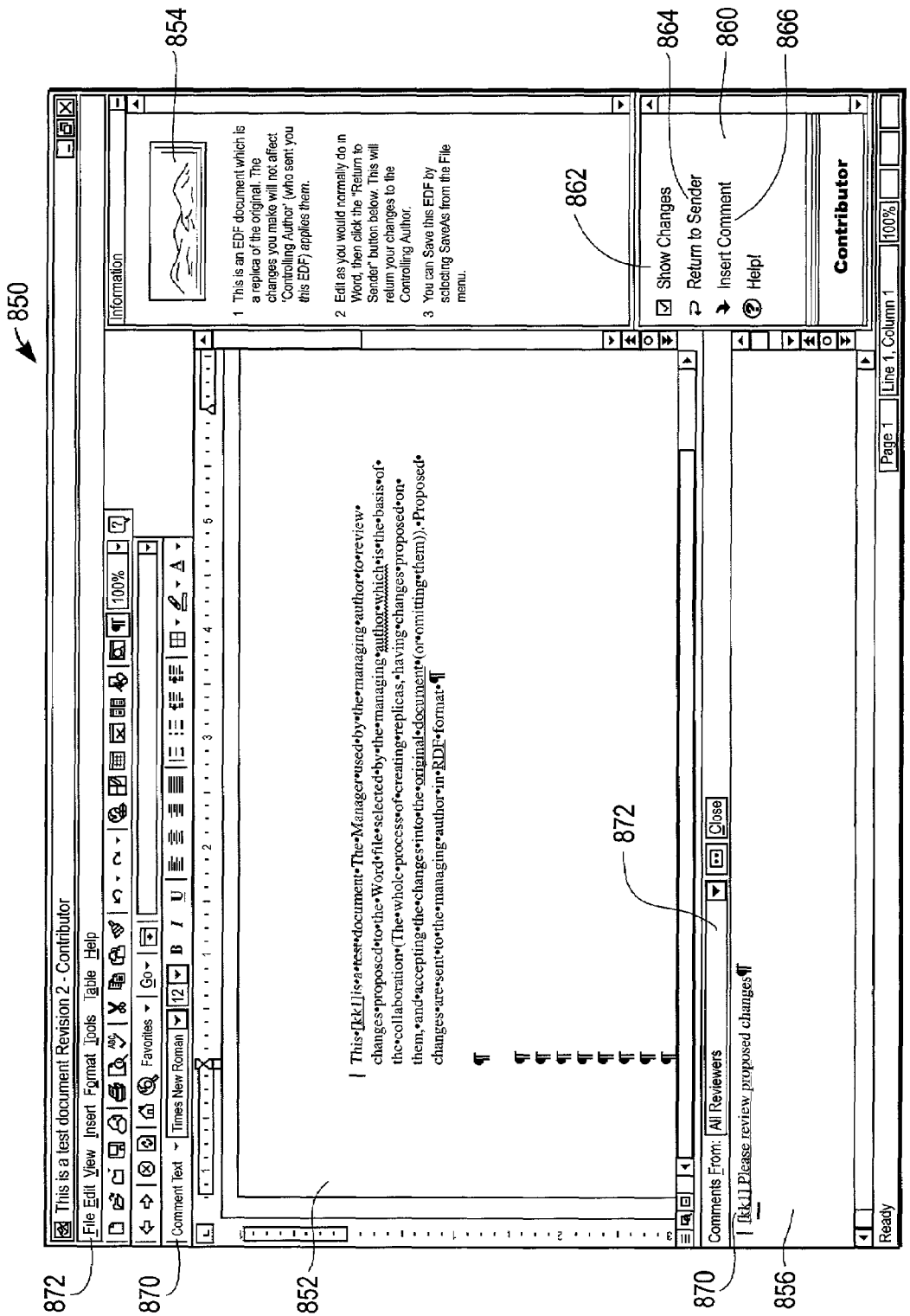
FIG. 13 shows the contributing author's graphical user interface (GUI) of an embodiment of the present invention.

FIG. 13 shows the contributing author's graphical user interface (GUI) of an embodiment of the present invention. The GUI 850 has an edit window 852 that displays the proposed changes to the replica, as they are entered by the contributing author, a branding window 854 which may include, for example, the company's logo, advertisements, announcements, instructions, or web links, a selection window 860 allowing certain contributing author selections, and a comment window 856 for reviewing comments in the edited replica shown in edit window 852. Selection window 860 includes a show changes selection 862, a return to sender selection 864, and an insert comment selection 866.

The contributing author edits and comments on text in the contributor application 516 when the edits and comments are displayed by GUI 850. The window 852 and its toolbar(s), e.g., toolbar 870, use an embedded copy of Word, so that the document may be edited and formatted in the window 852 exactly as any ordinary Word document is. The editing restrictions are implemented by, removing or making non-selectable, certain options on the Word menus and by disabling the default shortcut keys.

For protected (no copy out or print) the default shortcut keys and corresponding menu items are disabled. An example includes: Control-C (copy), Control-V (paste), Control-INS (paste), Control-X (cut), Control-P (print), and ALT-F11 (Visual Basic for Applications Editor). This is done by removing the options in the templates, which are consequently embedded into the running instance of Word. The copied text is deleted from the Microsoft® Windows clipboard object as soon as the contributor application looses focus.

For lock text (comment only) which prevents the user from entering text either directly from the keyboard or from copy and paste actions, the default shortcut keys and corresponding menu items are removed. An example includes: Control-C (copy), Control-V (paste), Control-INS (paste), Control-X (cut), Control-P (print), and ALT-F11 (Visual Basic for Applications Editor). Again this is attained by removing the options in the templates, where the templates are consequently embedded into the running instance of Word. The copied text is deleted from the clipboard object as soon as the contributor application loses focus.

For the document expiry date in the EDF file, the contributor application will display an error message if the document has expired and not open the document. The standard time is GMT to ensure that the expiry dates would be consistent in different time zones.

In addition the formats are restricted to ensure they are compatible with the Word program embedded in the manager application. This is to prevent format corruption.

The edits to the replica may be viewed in the edit window 852 as they are typed in, by checking the 'Show Changes' checkbox 862. For example, inserted text appears blue and underlined. Deleted text appears red and struck-through. The proposed changes will be visible to the managing author regardless of whether they have been highlighted with 'Show Changes' or not. This means that any changes that the contributing author makes are displayed to the managing author. This is a security feature to prevent the inadvertent or intentional hiding of changes, which can occur in Word by turning off the "Track Changes," when reviewing a document. Thus the Show Changes feature 862 is only there to help the contribution author as he/she types. In addition, the contributing author may find it easier to edit the replica without the redline. In this case recording the changes is, in effect, automatically done for the contributing author.

A comment may be inserted by using the 'Insert Comment' 866 in the Selection window 860. A number appears in the edit window 852 that corresponds to a number in the Comment window 856. Comments may appear, for example, as blue underlined text, with a yellow marker next to them. There are three ways to navigate through comments: 1) use the numbers, e.g., number 870, of the comments to go to specific comments; 2) use the 'Comments From' drop-down list 872 to select a Reviewer; and 3) use the Previous/Next change icons on the Word toolbar. This will scroll through ordinary text changes as well as comments.

To return the edited replica to the managing Author the Return to Sender button 864 is selected. An e-mail window with the edited replica attached as a response file (RDF format) opens up. If the contributing author's name and e-mail address has not been entered previously, then the contributor application will request this information. In one embodiment the e-mail cannot be sent until both fields are filled in.

Figure 14:
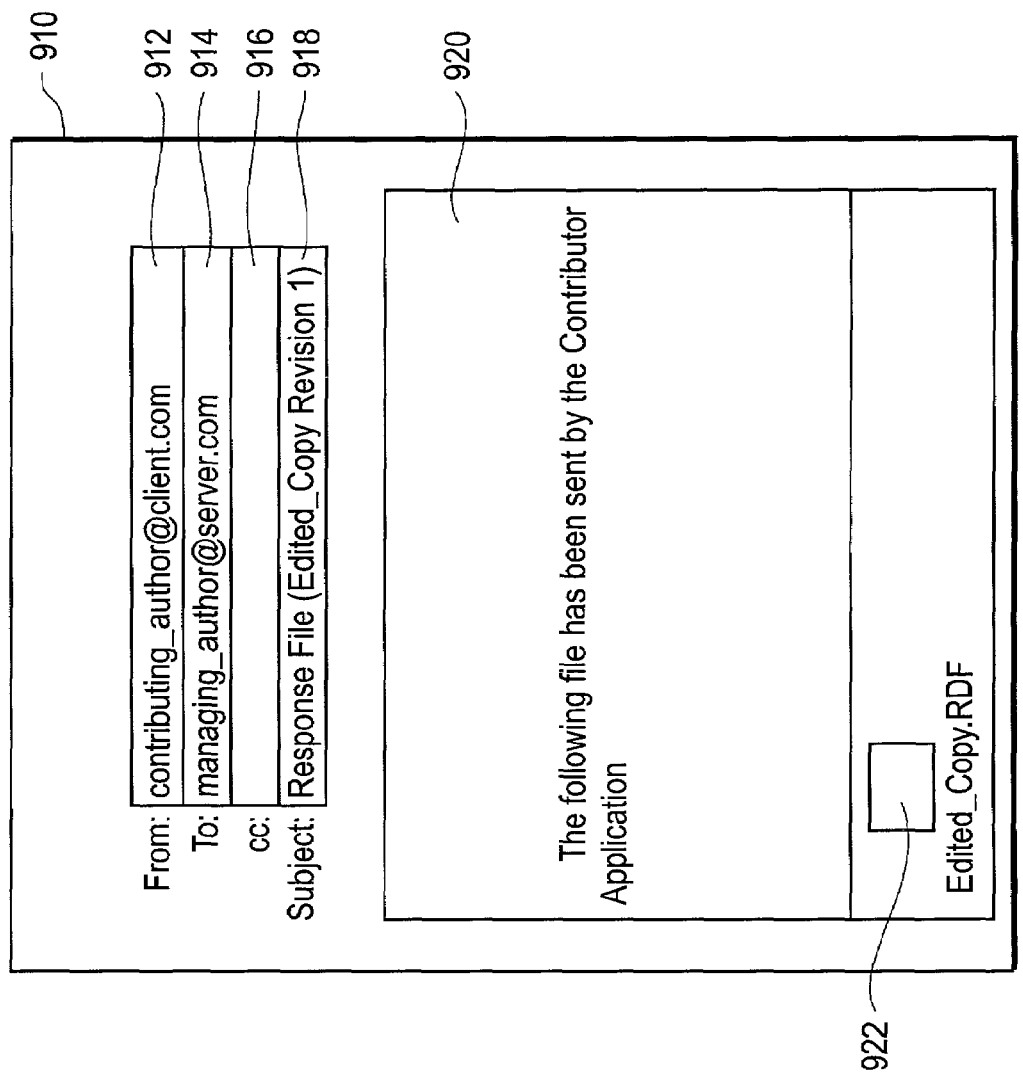
FIG. 14 is a response e-mail from the contributing author to the managing author of an aspect of the present invention.

FIG. 14 is a response e-mail from the contributing author to the managing author of an aspect of the present invention. The e-mail 910 includes the pre-filled "From" field 912 e.g. "contributing_author@client.com", the pre-filled "To" field 914, e.g., "managing_author@server.com", and the pre-filled "Subject" field 918, e.g. "response file (edited copy revision 1)". In another embodiment the "To:" field 914 must be filled in with the e-mail address of the managing author. The contributor module 516 inserts the title, e.g., "edited_copy" and revision number, e.g., revision 1, of the attached response file into the subject field 918. There maybe also be a predetermined text message in the text field 920 of e-mail 910. Attached to the e-mail 910 is the RDF file 922, e.g., "edited_copy.RDF". Upon clicking send (not shown) the e-mail is sent to the managing author's email account, or another account if so specified.

The receive module 518 of one embodiment of the present invention gets the e-mail and extracts the RDF file. The encrypted RDF file is decrypted. The difference file and the XML data are then extracted from the decrypted RDF file. The receive module displays the details of who has sent a particular response. The following details may be altered by the managing author: sender's name, sender's e-mail address, and the title of the response (the sender's name is used as a default title). If there is more than one revision associated with the collaboration, a revision to import the response into may be selected (the latest revision being the default).

The receive module then passes the difference file to the controller module 520 for processing and display. The controller module 520 allows the managing author to review all the changes that have been proposed on the EDFs that were sent out to the contributing authors. The controller module 520 allows navigation between different responses, browsing of proposed changes, and accepting of proposed changes into the evolving document. The GUI associated with the controller module 520 includes (in its default form) two windows and associated toolbars. The windows show the original document as it is being updated with accepted changes and a comparison of the original document with a response file. A third window, the change summary window, can be toggled on or off. It provides advanced change-navigation facilities. The evolving document window shows the original document as it is updated with accepted changes. The comparison window shows a comparison between any single response and the original document. The tabs under the comparison window are used to change comparisons. The change summary window provides a list of all changes in all responses as an expandable hierarchy. Changes can be examined under section view, person view and type view.

Figure 15:
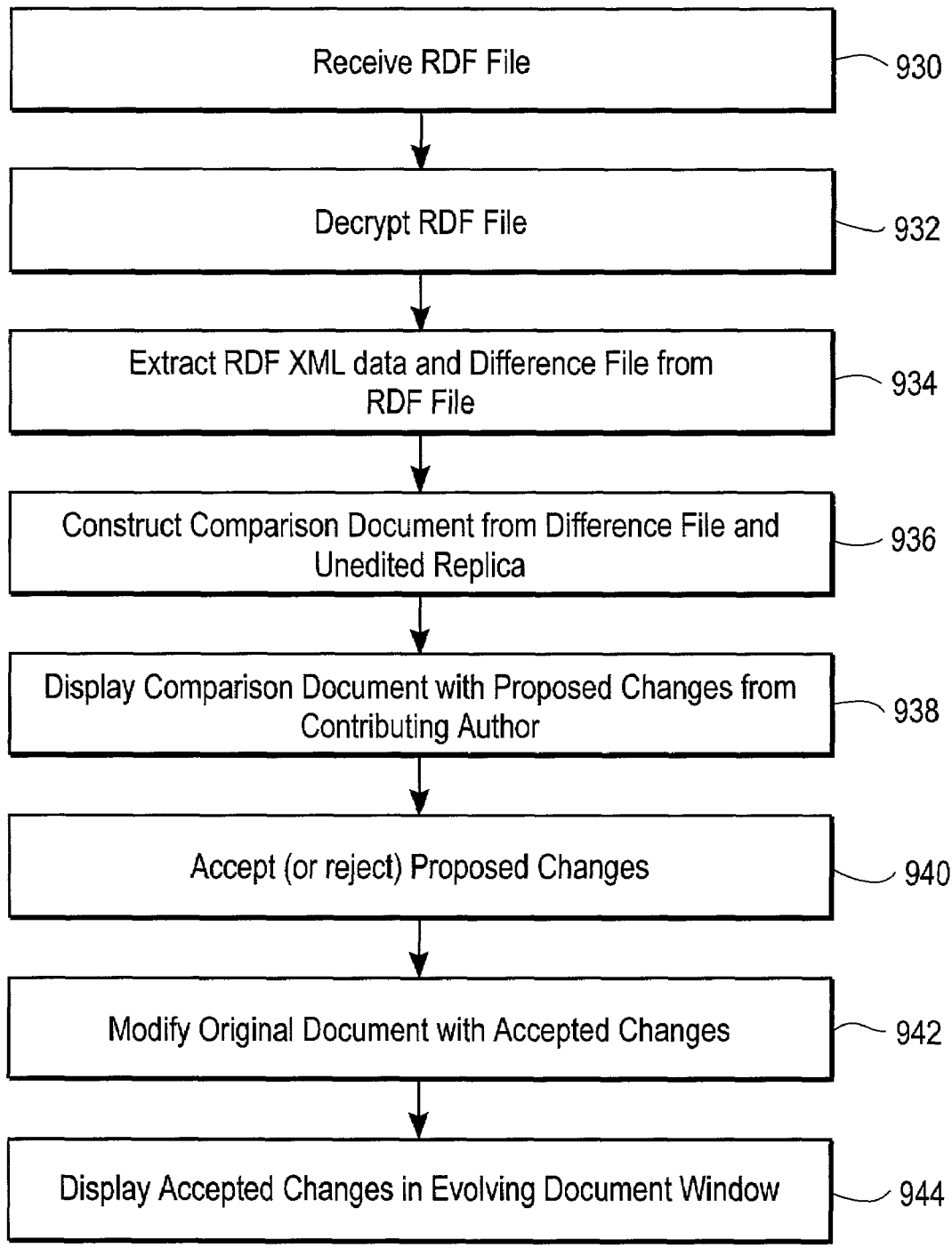
FIG. 15 is a simplified flowchart of the process of receiving and accepting proposed changes by the managing author of an embodiment of the present invention.

FIG. 15 is a simplified flowchart of the process of receiving and accepting proposed changes by the managing author of an embodiment of the present invention. At step 930 the RDF file is received by the receive module 518. At step 932 the receive module decrypts the RDF file. At step 934 the XML data and the difference file is extracted from the decrypted RDF file. At step 936 the comparison document is created from the difference file and the unedited replica, e.g., the original file. The comparison file is the reconstructed edited replica annotated with the proposed changes from a contributing author. The comparison file is displayed in the comparison window (step 938). The managing author then accepts or rejects the proposed changes (step 940), and the accepted changes are incorporated into the original document (step 942) and shown in the evolving document window (step 944). The original document is modified with the accepted changes. And as other changes are accepted, the modified original document is further modified, hence the original document becomes an evolving document with the filename of the original document. The evolving document has no change annotations and shows what the final document would look like with the accepted changes.

Figure 16:
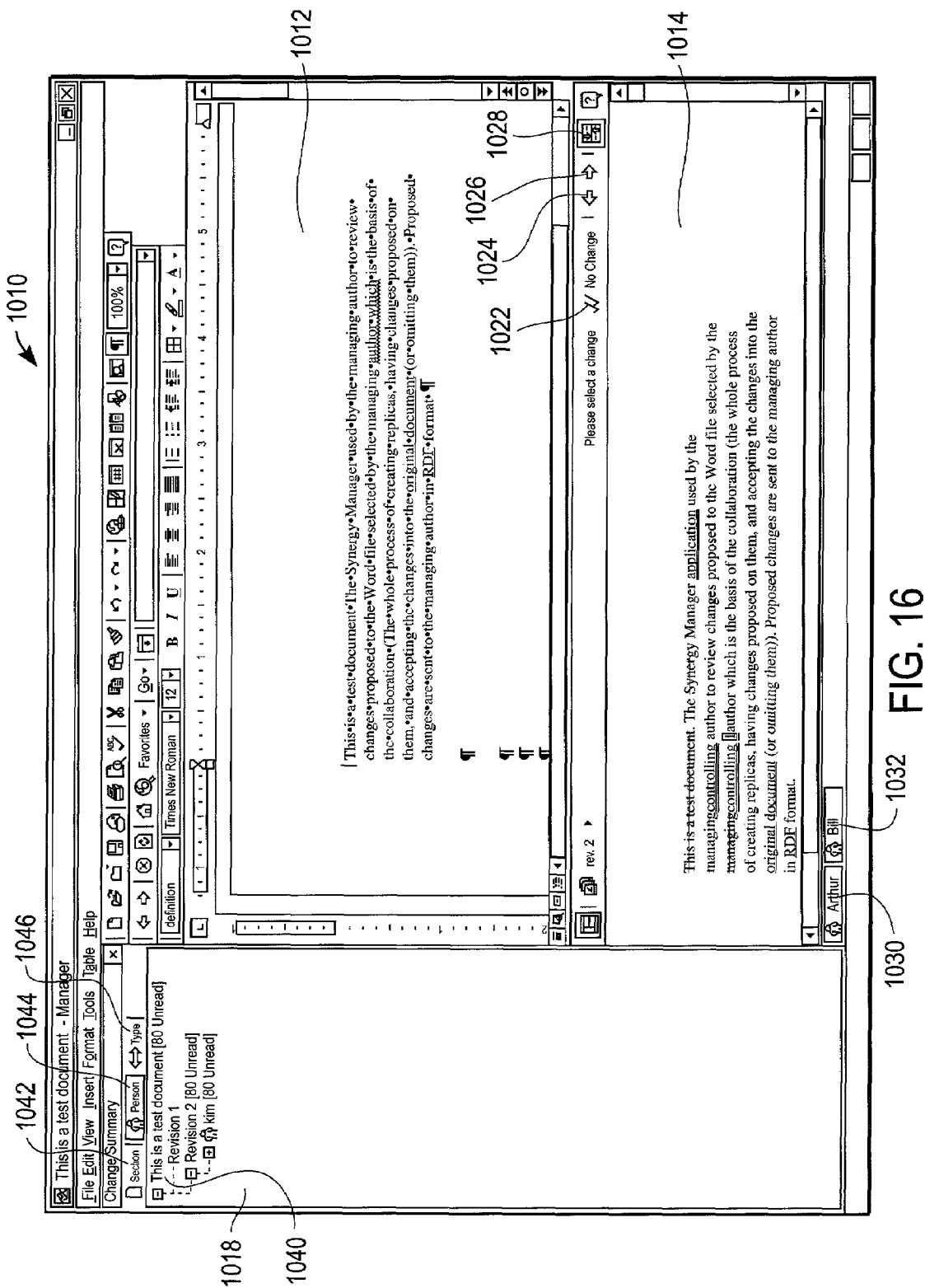
FIG. 16 is a GUI used by the managing author of an embodiment of the present invention.

FIG. 16 is a GUI used by the managing author of an embodiment of the present invention. The GUI 1010 is displayed on managing author's computer 214 and uses manager application 216. GUI 1010 includes an evolving document window 1012, a comparison window 1014, and a change summary window 1018. The evolving document window 1012 shows the changes to the original document as the managing author selects the proposed changes from the contributing author shown in the comparison window 1014. The document in the evolving document window 1012 is evolving, because as the manager selects a proposed change, the results are directly reflected in the evolving document window 1012. If the managing author does not like the change then an undo control allows the change to be undone. Thus the managing author can interactively select and view the selected changes. The comparison window 1014 has tabs, e.g., Arthur tab 1030 and Bill tab 1032, to show the proposed changes from the contributing author whose tab is selected. In this embodiment only one comparison window 1014 corresponding to the selected tab, e.g., Arthur tab 1030, is visible at a time. In another embodiment, one or more of the other tabs have their comparison contents displayed in separate windows or other windows. The comparison window has the following user selections: an apply change selection 1022 for accepting the proposed change or undoing the selected change after accepting it, a previous change selection 1024 for viewing the previous proposed change, a subsequent to change selection 1026 for viewing the next proposed change, and a synchronize selection 1028 for aligning a change highlighted in the comparison window 1014 with associated text in the evolving window 1012. As a proposed change is first highlighted in the comparison window 1014 and then selected using the apply change selection 1022, the selected change is immediately reflected in the evolving document window 1012. The change summary window 1018 shows three kinds of hierarchical trees: section 1042, person 1044, and type 1046.

The comparison window 1014 displays a scrollable view of the unedited document with the proposed changes. If a change is highlighted the controller module 520 searches for the proposed change itself and text to each side of it. The controller module 520 may find several instances which appear to match this criteria (hence the previous change selection 1024 button and the subsequent change selection 1026 button). The number of characters that is searched on either side of a proposed change is predetermined. Setting higher numbers increases the chances of finding the correct instance of the proposed change.

The "contributors" tabs below the comparison window 1014 are used to switch between the comparisons of different contributing authors, e.g., Arthur 1030 or Bill 1032. In this embodiment only tabs relating to the current revision are displayed. Changes in the comparison window 1014 are represented by different colors. In addition to selecting a change using selection 1022, whole blocks of text may be selected in the comparison window 1014 and moved into the evolving document window 1012 by dragging and dropping. Any mark-up in the text (introduced as part of the comparison process) is stripped out. Changes that are either deletions or the sources of moved text will not be copied across. Text pasted into the evolving document will adopt the style of the text already in the evolving document.

The evolving document window 1012 is a view of the original document as it is being updated with accepted changes. In one embodiment the changes are made directly to the original document file, so that the original document evolves from original to final. The window and its toolbar are an embedded copy of Word, so that the text in the evolving document window 1012 may be edited and formatted in the evolving document window 1012 like any ordinary Word document. Thus, for example, even if a change is accepted into the evolving document window 1012, it can still be deleted manually. Since the evolving document window 1012 is tied to the evolving document, a save of the text in the evolving document window saves to the evolving document file (i.e., the original document file).

The change summary window 1018 is used to navigate between (and accept or reject) proposed changes in three modes (section view 1042, person view 1044, and type view 1046). Section view 1042 lists all the proposed changes under each separate section of the original document. Thus all proposed changes that have been suggested to the first paragraph will appear together, all those suggested to the second paragraph will appear together and so on. The first few words of each section are displayed to help to identify the proposed change. The person view 1044 lists all the proposed changes suggested by contributing authors under their name. The type view 1046 lists all changes under the different types of changes: replacements, deletions, insertions and moves (sources and destinations). A proposed change is applied in the change summary window 1018, by selecting the proposed change in the expandable hierarchy and from a pop-up menu choosing "Apply". Accepted or rejected changes are marked within the change summary window 1018.

FIG. 17 shows an example of a change summary window 1018 with the section tab 1042 selected of an aspect of the present invention. The expandable root 1112 of the hierarchical tree shown indicates the name of the document, e.g., "draft contract 1". The root node 1112 is expanded into revisions, e.g. "Revision 1" 1114, which is further expanded into section, e.g., "incapacity. In . . . " and "The Settlement Agreement has. . . . " 1116.

FIG. 18 shows an example of a change summary window 1018 with the person tab 1044 selected of another aspect of the present invention. The expandable root 1222 of the hierarchical tree shown indicates the name of the document, e.g., "wstext". The root node 1222 is expanded into revisions in e.g. "Revision 1" 1224, which is further expanded into contributing author's e.g. Bill 1230 and Arthur 1240.

FIG. 19 shows change summary window 1018 with the type tab 1046 selected of yet another aspect of the present invention. The expandable root 1322 of the hierarchical tree shown indicates the name of the document, e.g., "wstext". The root node 1322 is expanded into revisions in e.g. "Revision 1" 1224. Each revision e.g. "Revision 1" 1224, may be expanded into different types of changes, e.g., replacements 1324, deletions 1326, and insertions 1330.

Further, while the invention has been described using a particular combination of hardware and software, it should be recognized that other combinations of hardware and software are also within the scope of the invention. The invention may be implemented only in hardware or only in software or combinations thereof.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the invention has been described using a particular series of transactions and steps, it should be apparent to those skilled in the art that the scope of the invention is not limited to the described series of transactions and steps.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method, using a computer system, for generating a response to an unedited replica of an original document sent by a managing author to a contributing author for review, comprising:

receiving said unedited replica at a client associated with said contributing author;

forming a first revised replica by editing said unedited replica;

partitioning said unedited replica into a first plurality of segments, wherein a segment of said first plurality of segments is delimited by a delimiter;

sorting segments of said first plurality of segments into a binary tree based on a comparison operator;

partitioning said first revised replica into a second plurality of segments;

finding a best match for a segment of said second plurality of segments in said binary tree to form a block of at least one matching byte;

creating a difference file, said difference file comprising: a plurality of copy packets and a plurality of difference packets, wherein said copy packets indicating position and length of said matched block, and said difference packets consisting of stream of bytes flanked by said copy packets;

storing said difference file in memory at said client to be transmitted to the managing author;

transmitting said difference file to a server associated with said managing author;

reconstructing the first revised replica by finding in the original document said matched block using the memory position and length as indicated in the copy packets; and forming a second revised replica identical to the first revised replica by copying said matched block into the second revised replica and inserting the difference packets into the second revised replica.

2. The method of claim 1 further comprising extending said block by matching bytes on both sides of said block.

3. The method of claim 1 wherein said best match comprises an exact match.

4. The method of claim 1 wherein said best match comprises a partial match.

5. A system for generating a response to an unedited replica of an original document sent by a managing author to a contributing author for review, comprising:

a processor;

a memory coupled to the processor;

means for receiving said unedited replica at a client associated with said contributing author;

means for forming a first revised replica by editing said unedited replica; means for partitioning said unedited replica into a first plurality of segments, wherein a segment of said first plurality of segments is delimited by a delimiter;

means for sorting segments of said first plurality of segments into a binary tree based on a comparison operator;

means for partitioning said first revised replica into a second plurality of segments;

finding a best match for a segment of said second plurality of segments in said binary tree to form a block of at least one matching byte;

means for creating a difference file, said difference file comprising: a plurality of copy packets and a plurality of difference packets, wherein said copy packets indicating position and length of said matched block, and said difference packets consisting of stream of bytes flanked by said copy packets;

means for storing said difference file in memory at said client to be transmitted to the managing author;

means for transmitting said difference file to a server associated with said managing author;

means for reconstructing the first revised replica by finding in the original document said matched block using the memory position and length as indicated in the copy packets; and means for forming a second revised replica identical to the first revised replica by copying said matched block into the second revised replica and inserting the difference packets into the second revised replica.

6. The system of claim 5 further comprising a means for extending said block by matching bytes on both sides of said block.

* * * * *